(12) United States Patent
Kanehara

(10) Patent No.: US 6,517,458 B2
(45) Date of Patent: Feb. 11, 2003

(54) ENDLESS METAL BELT FOR METAL BELT TYPE NONSTEP VARIABLE-SPEED TRANSMISSION

(75) Inventor: Shigeru Kanehara, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/813,284

(22) Filed: Mar. 21, 2001

(65) Prior Publication Data

US 2001/0039225 A1 Nov. 8, 2001

(30) Foreign Application Priority Data

Mar. 24, 2000 (JP) .......................... 2000-083842

(51) Int. Cl.$^7$ .............................. F16G 1/21; F16G 5/16
(52) U.S. Cl. ..................... 474/245; 474/242; 474/201; 474/244
(58) Field of Search ................. 474/245, 201, 474/242, 244

(56) References Cited

U.S. PATENT DOCUMENTS

| | | | | |
|---|---|---|---|---|
| 4,213,350 A | * | 7/1980 | Horowitz et al. | ........... 474/244 |
| 4,580,998 A | * | 4/1986 | Brown | ........... 474/201 |
| 6,217,471 B1 | * | 4/2001 | Brandsma et al. | ........... 474/201 |
| 6,283,882 B1 | * | 9/2001 | Nonaka et al. | ........... 474/201 |
| 6,334,831 B1 | * | 1/2002 | Smeets et al. | ........... 474/201 |

FOREIGN PATENT DOCUMENTS

| | | |
|---|---|---|
| EP | 0 366 169 A1 | 5/1990 |
| EP | 0 950 830 A1 | 10/1999 |
| EP | 1 020 658 A1 | 7/2000 |
| JP | 2-146334 | 6/1990 |
| JP | 5-8358 | 3/1993 |

OTHER PUBLICATIONS

Patent Abstract of Japan, Publication No. 01040737 on Feb. 13, 1989.

* cited by examiner

Primary Examiner—Christopher P. Schwartz
Assistant Examiner—Devon Kramer
(74) Attorney, Agent, or Firm—Armstrong, Westerman & Hattori, LLP

(57) ABSTRACT

An endless metal belt (15) is formed by layering thin metal rings (30) in thicknesses to form tow layered ring structures (31) and fitting the two layered ring structures in slots (32a) formed in opposite side parts of each of metal blocks (32), extending on the opposite sides of a neck part (32e) of the metal block. The endless metal belt is extended between drive and driven pulleys (6, 11) respectively having variable effective diameters to change speed change ratio. Side edges of the inner and the outer circumference (30a, 30b) of the thin metal ring are rounded in round side edges of a radius $R_R$ of curvature, middle parts of opposite side surfaces (30c) of each thin metal ring are flat, front and rear edges of opposite side surfaces of the neck part of each metal block are rounded in round edges (32f) of a radius $R_0$ of curvature, and the radius $R_R$ of curvature and the radius $R_0$ of curvature are determined so that a stress relating to fatigue strength and induced in the inner circumference of the innermost thin metal ring ($30_1$) is equal to or lower than a stress relating to fatigue strength and induced in the inner side surface ($30c$) of the thin metal ring by the front and the rear edges of the side surface of the neck part of the metal block that come into contact with the thin metal ring.

3 Claims, 24 Drawing Sheets

Contact load on DR (kgf)     Contact length on DR
Contact load on DN (kgf)     Contact length on DN Table 1

| Radius $R_R$ (mm) | Height h (mm) | Neck contact width (mm) | Total neck contact width (DR)(mm) | Total neck contact width (DN)(mm) | Neck Hertz compressive stress (kgf/mm²) $\sigma hN$ (DR) | Neck Hertz compressive stress (kgf/mm²) $\sigma hN$ (DN) | Internal stress in the innermost thin metal ring (kgf/mm²) $\sigma a$ | Internal stress in the innermost thin metal ring (kgf/mm²) $\sigma m$ | Internal stress in the innermost thin metal ring (kgf/mm²) $\sigma a^*$ | Stress in the inner side surface of the innermost thin metal ring (kgf/mm²) $\sigma aHN$ | Stress in the inner side surface of the innermost thin metal ring (kgf/mm²) $\sigma mHN$ | Stress in the inner side surface of the innermost thin metal ring (kgf/mm²) $\sigma a^*HN$ |
|---|---|---|---|---|---|---|---|---|---|---|---|---|
| 0 | 0 | 0.18 | 27.684 | 13.662 | 50.4 | 45.7 | 60 | -8 | 57.33 | | | |
| 0.01 | 0.01 | 0.16 | 24.608 | 12.144 | 53.5 | 48.6 | 34.9 | 15.2 | 39.97 | 59.2 | -9.1 | 56.17 |
| 0.02 | 0.02 | 0.14 | 21.532 | 10.626 | 57.2 | 51.9 | 32.6 | 15.6 | 37.80 | 58.6 | -10.4 | 55.13 |
| 0.03 | 0.03 | 0.12 | 18.456 | 9.108 | 61.7 | 56 | 30.3 | 16 | 35.63 | 58.3 | -12 | 54.30 |
| 0.04 | 0.04 | 0.1 | 15.38 | 7.59 | 67.6 | 61.3 | 28.1 | 16.3 | 33.53 | 58.7 | -14.3 | 53.93 |
| 0.05 | 0.05 | 0.08 | 12.304 | 6.072 | 75.7 | 68.5 | 25.8 | 16.7 | 31.37 | 60.1 | -17.6 | 54.23 |
| 0.06 | 0.06 | 0.06 | 9.228 | 4.554 | 87 | 78.8 | 23.5 | 17.1 | 29.20 | 64.3 | -23.7 | 56.40 |
| 0.07 | 0.07 | 0.04 | 6.152 | 3.036 | 106.6 | 97.6 | 21.2 | 17.5 | 27.03 | 72.7 | -34 | 61.37 |
| 0.08 | 0.08 | 0.02 | 3.076 | 1.158 | 150.8 | 138 | 18.9 | 17.9 | 24.87 | 94.3 | -56.6 | 75.43 |
| 0.09 | 0.09 | 0 | 0 | 0 | - | - | 16.6 | 18.3 | 22.60 | | | |
| 0.08 | 0.1 | 0.02 | 3.076 | 1.158 | 150.8 | 138 | 18.9 | 18.7 | 25.13 | 90.6 | -57.6 | 71.40 |
| 0.07 | 0.11 | 0.04 | 6.152 | 3.036 | 106.6 | 97.6 | 21.1 | 19.1 | 27.47 | 67.1 | -36 | 55.10 |
| 0.06 | 0.12 | 0.06 | 9.228 | 4.554 | 87 | 78.8 | 23.5 | 19.5 | 30.00 | 55.9 | -26.7 | 47.00 |
| 0.05 | 0.13 | 0.08 | 12.304 | 6.072 | 75.7 | 68.5 | 25.8 | 19.9 | 32.43 | 48.8 | -21.5 | 41.63 |
| 0.04 | 0.14 | 0.1 | 15.38 | 7.59 | 67.6 | 61.3 | 28.1 | 20.3 | 34.87 | 43.3 | -17.9 | 37.33 |
| 0.03 | 0.15 | 0.12 | 18.456 | 9.108 | 61.7 | 56 | 30.3 | 20.7 | 37.20 | 39 | -15.5 | 33.83 |
| 0.02 | 0.16 | 0.14 | 21.532 | 10.626 | 57.2 | 51.9 | 32.6 | 21.2 | 39.67 | 35.3 | -13.7 | 30.73 |
| 0.01 | 0.17 | 0.16 | 24.608 | 12.144 | 53.5 | 48.6 | 34.9 | 21.4 | 42.03 | 32 | -12.3 | 27.90 |
| 0 | 0.18 | 0.18 | 27.684 | 13.662 | 50.4 | 45.7 | 37.2 | 21.8 | 44.47 | | | |

Contact load on DR (kgf)    Contact length on DR
Contact load on DN (kgf)    Contact length on DN Table 2

| Radius $R_R$ (mm) | Height $h$ (mm) | Neck contact width (mm) | Total neck contact width (DR)(mm) | Total neck contact width (DN)(mm) | Neck Hertz compressive stress(kgf/mm²) $\sigma hN$ (DR) | Neck Hertz compressive stress(kgf/mm²) $\sigma hN$ (DN) | Internal stress in the innermost thin metal ring (kgf/mm²) $\sigma a$ | Internal stress in the innermost thin metal ring (kgf/mm²) $\sigma m$ | Internal stress in the innermost thin metal ring (kgf/mm²) $\sigma a^*$ | Stress in the inner side surface of the innermost thin metal ring (kgf/mm²) $\sigma aHN$ | Stress in the inner side surface of the innermost thin metal ring (kgf/mm²) $\sigma mHN$ | Stress in the inner side surface of the innermost thin metal ring (kgf/mm²) $\sigma a^*HN$ |
|---|---|---|---|---|---|---|---|---|---|---|---|---|
| 0 | 0 | 0.18 | 27.684 | 13.662 | 42.6 | 38.6 | 60 | -8 | 57.33 | | | |
| 0.01 | 0.01 | 0.16 | 24.608 | 12.144 | 45.2 | 41.1 | 34.9 | 15.2 | 39.97 | 55.5 | -5.4 | 53.70 |
| 0.02 | 0.02 | 0.14 | 21.532 | 10.626 | 48.4 | 43.9 | 32.6 | 15.6 | 37.80 | 54.9 | -6.4 | 52.77 |
| 0.03 | 0.03 | 0.12 | 18.456 | 9.108 | 52.2 | 47.4 | 30.3 | 16 | 35.63 | 54 | -7.7 | 51.43 |
| 0.04 | 0.04 | 0.1 | 15.38 | 7.59 | 57.2 | 51.8 | 28.1 | 16.3 | 33.53 | 54 | -9.6 | 50.80 |
| 0.05 | 0.05 | 0.08 | 12.304 | 6.072 | 64 | 57.9 | 25.8 | 16.7 | 31.37 | 54.7 | -12.2 | 50.63 |
| 0.06 | 0.06 | 0.06 | 9.228 | 4.554 | 74 | 66.6 | 23.5 | 17.1 | 29.20 | 57.8 | -17.2 | 52.07 |
| 0.07 | 0.07 | 0.04 | 6.152 | 3.036 | 90.1 | 82.5 | 21.2 | 17.5 | 27.03 | 64.5 | -25.8 | 55.90 |
| 0.08 | 0.08 | 0.02 | 3.076 | 1.158 | 127.4 | 116.7 | 18.9 | 17.9 | 24.87 | 81.7 | -44.9 | 66.73 |
| 0.09 | 0.09 | 0 | 0 | 0 | — | — | 16.6 | 18.3 | 22.60 | | | |
| 0.08 | 0.1 | 0.02 | 3.076 | 1.158 | 127.4 | 116.7 | 18.9 | 18.7 | 25.13 | 78.9 | -45.9 | 63.60 |
| 0.07 | 0.11 | 0.04 | 6.152 | 3.036 | 90.1 | 82.5 | 21.1 | 19.1 | 27.47 | 58.8 | -27.7 | 49.57 |
| 0.06 | 0.12 | 0.06 | 9.228 | 4.554 | 74 | 66.6 | 23.5 | 19.5 | 30.00 | 49.4 | -20.2 | 42.67 |
| 0.05 | 0.13 | 0.08 | 12.304 | 6.072 | 64 | 57.9 | 25.8 | 19.9 | 32.43 | 42.9 | -15.6 | 37.70 |
| 0.04 | 0.14 | 0.1 | 15.38 | 7.59 | 57.2 | 51.8 | 28.1 | 20.3 | 34.87 | 38.1 | -12.7 | 33.87 |
| 0.03 | 0.15 | 0.12 | 18.456 | 9.108 | 52.2 | 47.4 | 30.3 | 20.7 | 37.20 | 34.2 | -10.7 | 30.63 |
| 0.02 | 0.16 | 0.14 | 21.532 | 10.626 | 48.4 | 43.9 | 32.6 | 21.2 | 39.67 | 30.9 | -9.3 | 27.80 |
| 0.01 | 0.17 | 0.16 | 24.608 | 12.144 | 45.2 | 41.1 | 34.9 | 21.4 | 42.03 | 27.9 | -8.2 | 25.17 |
| 0 | 0.18 | 0.18 | 27.684 | 13.662 | 42.6 | 38.6 | 37.2 | 21.8 | 44.47 | | | |

Contact load on DR (kgf)  Contact length on DR
Contact load on DN (kgf)  Contact length on DN Table 3

| Radius $R_R$ (mm) | Height h (mm) | Neck contact width (mm) | Total neck contact width (DR)(mm) | Total neck contact width (DN)(mm) | Neck Hertz compressive stress (kgf/mm²) σhN (DR) | Neck Hertz compressive stress (kgf/mm²) σhN (DN) | Internal stress in the innermost thin metal ring (kgf/mm²) σa | σm | σa* | Stress in the inner side surface of the innermost thin metal ring (kgf/mm²) σaHN | σmHN | σa*HN |
|---|---|---|---|---|---|---|---|---|---|---|---|---|
| 0 | 0 | 0.18 | 27.684 | 13.662 | 35.7 | 32.3 | 60 | -8 | 57.33 | | | |
| 0.01 | 0.01 | 0.16 | 24.608 | 12.144 | 37.8 | 34.4 | 34.9 | 15.2 | 39.97 | 52.1 | -2 | 51.43 |
| 0.02 | 0.02 | 0.14 | 21.532 | 10.626 | 40.5 | 36.7 | 32.6 | 15.6 | 37.80 | 51 | -2.8 | 50.07 |
| 0.03 | 0.03 | 0.12 | 18.456 | 9.108 | 43.6 | 39.6 | 30.3 | 16 | 35.63 | 50.1 | -3.8 | 48.83 |
| 0.04 | 0.04 | 0.1 | 15.38 | 7.59 | 47.8 | 43.4 | 28.1 | 16.3 | 33.53 | 49.8 | -5.4 | 48.00 |
| 0.05 | 0.05 | 0.08 | 12.304 | 6.072 | 53.5 | 48.4 | 25.8 | 16.7 | 31.37 | 50 | -7.5 | 47.50 |
| 0.06 | 0.06 | 0.06 | 9.228 | 4.554 | 61.5 | 55.7 | 23.5 | 17.1 | 29.20 | 51.6 | -11 | 47.93 |
| 0.07 | 0.07 | 0.04 | 6.152 | 3.036 | 75.4 | 69 | 21.2 | 17.5 | 27.03 | 57.1 | -18.4 | 50.97 |
| 0.08 | 0.08 | 0.02 | 3.076 | 1.158 | 106.6 | 97.6 | 18.9 | 17.9 | 24.87 | 71.3 | -34.5 | 59.80 |
| 0.09 | 0.09 | 0 | 0 | 0 | – | – | 16.6 | 18.3 | 22.60 | | | |
| 0.08 | 0.1 | 0.02 | 3.076 | 1.158 | 106.6 | 97.6 | 18.9 | 18.7 | 25.13 | 68.5 | -35.5 | 56.67 |
| 0.07 | 0.11 | 0.04 | 6.152 | 3.036 | 75.4 | 69 | 21.1 | 19.1 | 27.47 | 51.5 | -20.4 | 44.70 |
| 0.06 | 0.12 | 0.06 | 9.228 | 4.554 | 61.5 | 55.7 | 23.5 | 19.5 | 30.00 | 43.1 | -13.9 | 38.47 |
| 0.05 | 0.13 | 0.08 | 12.304 | 6.072 | 53.5 | 48.4 | 25.8 | 19.9 | 32.43 | 37.7 | -10.4 | 34.23 |
| 0.04 | 0.14 | 0.1 | 15.38 | 7.59 | 47.8 | 43.4 | 28.1 | 20.3 | 34.87 | 33.4 | -8 | 30.73 |
| 0.03 | 0.15 | 0.12 | 18.456 | 9.108 | 43.6 | 39.6 | 30.3 | 20.7 | 37.20 | 29.9 | -6.4 | 27.77 |
| 0.02 | 0.16 | 0.14 | 21.532 | 10.626 | 40.5 | 36.7 | 32.6 | 21.2 | 39.67 | 27 | -5.4 | 25.20 |
| 0.01 | 0.17 | 0.16 | 24.608 | 12.144 | 37.8 | 34.4 | 34.9 | 21.4 | 42.03 | 25.3 | -3.4 | 24.17 |
| 0 | 0.18 | 0.18 | 27.684 | 13.662 | 35.7 | 32.3 | 37.2 | 21.8 | 44.47 | | | |

Contact load on DR (kgf) — Contact length on DR
Contact load on DN (kgf) — Contact length on DN Table 4

| Radius $R_R$ (mm) | Height h (mm) | Neck contact width (mm) | Total neck contact width (DR)(mm) | Total neck contact width (DN)(mm) | Neck Hertz compressive stress (kgf/mm²) $\sigma hN$ (DR) | Neck Hertz compressive stress (kgf/mm²) $\sigma hN$ (DN) | Internal stress in the innermost thin metal ring (kgf/mm²) $\sigma a$ | Internal stress in the innermost thin metal ring (kgf/mm²) $\sigma m$ | Internal stress in the innermost thin metal ring (kgf/mm²) $\sigma a^*$ | Stress in the inner side surface of the innermost thin metal ring (kgf/mm²) $\sigma aHN$ | Stress in the inner side surface of the innermost thin metal ring (kgf/mm²) $\sigma mHN$ | Stress in the inner side surface of the innermost thin metal ring (kgf/mm²) $\sigma a^*HN$ |
|---|---|---|---|---|---|---|---|---|---|---|---|---|
| 0 | 0 | 0.18 | 27.684 | 13.662 | 29.1 | 26.4 | 60 | -8 | 57.33 | | | |
| 0.01 | 0.01 | 0.16 | 24.608 | 12.144 | 30.9 | 28.1 | 34.9 | 15.2 | 39.97 | 49 | 1.1 | 49.37 |
| 0.02 | 0.02 | 0.14 | 21.532 | 10.626 | 33.1 | 30 | 32.6 | 15.6 | 37.80 | 47.6 | 0.6 | 47.80 |
| 0.03 | 0.03 | 0.12 | 18.456 | 9.108 | 35.6 | 32.4 | 30.3 | 16 | 35.63 | 46.5 | -0.2 | 46.43 |
| 0.04 | 0.04 | 0.1 | 15.38 | 7.59 | 39.1 | 35.4 | 28.1 | 16.3 | 33.53 | 45.8 | -1.4 | 45.33 |
| 0.05 | 0.05 | 0.08 | 12.304 | 6.072 | 43.7 | 39.5 | 25.8 | 16.7 | 31.37 | 45.5 | -3 | 44.50 |
| 0.06 | 0.06 | 0.06 | 9.228 | 4.554 | 50.5 | 45.5 | 23.5 | 17.1 | 29.20 | 46.2 | -5.6 | 44.33 |
| 0.07 | 0.07 | 0.04 | 6.152 | 3.036 | 61.5 | 56.4 | 21.2 | 17.5 | 27.03 | 50.2 | -11.5 | 46.37 |
| 0.08 | 0.08 | 0.02 | 3.076 | 1.158 | 87 | 79.7 | 18.9 | 17.9 | 24.87 | 61.5 | -24.7 | 53.27 |
| 0.09 | 0.09 | 0 | 0 | 0 | — | — | 16.6 | 18.3 | 22.60 | | | |
| 0.08 | 0.1 | 0.02 | 3.076 | 1.158 | 87 | 79.7 | 18.9 | 18.7 | 25.13 | 58.7 | -25.7 | 50.13 |
| 0.07 | 0.11 | 0.04 | 6.152 | 3.036 | 61.5 | 56.4 | 21.1 | 19.1 | 27.47 | 44.5 | -13.4 | 40.03 |
| 0.06 | 0.12 | 0.06 | 9.228 | 4.554 | 50.5 | 45.5 | 23.5 | 19.5 | 30.00 | 37.6 | -8.4 | 34.80 |
| 0.05 | 0.13 | 0.08 | 12.304 | 6.072 | 43.7 | 39.5 | 25.8 | 19.9 | 32.43 | 32.8 | -5.5 | 30.97 |
| 0.04 | 0.14 | 0.1 | 15.38 | 7.59 | 39.1 | 35.4 | 28.1 | 20.3 | 34.87 | 29.1 | -3.7 | 27.87 |
| 0.03 | 0.15 | 0.12 | 18.456 | 9.108 | 35.6 | 32.4 | 30.3 | 20.7 | 37.20 | 25.9 | -2.4 | 25.10 |
| 0.02 | 0.16 | 0.14 | 21.532 | 10.626 | 33.1 | 30 | 32.6 | 21.2 | 39.67 | 24.3 | -0.6 | 24.10 |
| 0.01 | 0.17 | 0.16 | 24.608 | 12.144 | 30.9 | 28.1 | 34.9 | 21.4 | 42.03 | 25 | -3.2 | 26.07 |
| 0 | 0.18 | 0.18 | 27.684 | 13.662 | 29.1 | 26.4 | 37.2 | 21.8 | 44.47 | | | |

ENDLESS METAL BELT FOR METAL BELT TYPE NONSTEP VARIABLE-SPEED TRANSMISSION

BACKGROUND OF THE INVENTION

1. Field of the Invention

The present invention relates to a durable endless metal belt for a metal belt type nonstep variable-speed transmission.

2. Description of the Related Art

When a metal belt type nonstep variable-speed transmission including a drive pulley, a driven pulley and an endless metal belt formed by engaging blocks with a layered ring formed by radially superposing thin metal rings, and extended between the drive and the driven pulley is in operation, the metal blocks are tilted about an axis perpendicular to a plane in which the endless metal belt turns due to the lateral dislocation of the endless metal belt and the inner side edges of the thin metal rings are pressed strongly against the side edges of neck parts of the metal blocks, so that the inner side edges of the thin metal rings are subject to damaging.

A technique proposed in JP-U No. Sho 63-82842 (JP-U No. Hei 5-8358) to prevent such a problem rounds each of the side surfaces of a neck part of the metal block in a curved surface of a predetermined radius of curvature about the front and the rear edge of the opposite side surfaces of the metal block, and rounds the intersection of the curved surfaces in a predetermined radius of curvature.

An invention disclosed in JP-A No. Hei 2-146334 rounds the side edges of a neck part of a metal block in a curved edge of 0.2 m in radius of curvature. However, neither of the prior art techniques determines the shape of the side edges of the neck part of the metal block rationally on the basis of the relation between a stress induced by a local pressure applied to the inner side surface of the thin metal ring and another stress induced in the thin metal ring.

In the aforesaid prior art, the curved side edge of the neck part of the metal block has a big radius of curvature, the side edge of the neck part of the metal block, which is difficult to machine, must be cut greatly, troublesome work is necessary for the inspection of the side edge of the neck part of the metal block to see if the side edge is rounded in a predetermined radius of curvature, the processing and inspection of the metal block takes much time and the metal block is produced at a low productivity.

SUMMARY OF THE INVENTION

It is an object of the present invention to incorporate improvements into such an endless metal belt for a metal belt type nonstep variable-speed transmission.

According to a first aspect of the present invention, an endless metal belt for a metal belt type nonstep variable-speed transmission, extended between a drive pulley and a driven pulley included in the metal belt type nonstep variable-speed transmission, the respective effective diameters of the drive and the driven pulley being variable to change speed change ratio, comprises: thin metal rings layered in thicknesses to form two layered ring structures; and a plurality of metal blocks arranged along and supported on the two layered ring structures; wherein the side edges of the inner and the outer circumference of each of the thin metal rings are rounded in round edges of a radius $R_R$ of curvature, middle parts of the opposite side surfaces of each thin metal ring are flat, front and rear edges of opposite side surfaces of a neck part of each metal block are rounded in round edges of a radius $R_0$ of curvature, respectively, and the radius $R_R$ of curvature of the round side edges of the inner and the outer circumference of each thin metal ring and the radius $R_0$ of curvature of the front and the rear round edge of opposite side surfaces of the neck part of each metal block are determined so that a stress relating to fatigue strength and induced in the inner circumference of the innermost thin metal ring is equal to or lower than a stress relating to fatigue strength and induced in the inner side surface of the thin metal ring by the front and the rear round edge of the side surface of the neck part of the metal block that comes into contact with the thin metal ring.

In the endless metal belt according to the first aspect of the present invention, damaging of the flat middle part of the inner side surface of the thin metal ring that touches the round edges of the side surface of the neck part of the metal block is avoided, the lest possible radius $R_0$ of curvature of the round edges of the side surface of the metal block is selected in relation with the radius $R_R$ of curvature of the round edges of the opposite side surfaces of the thin metal ring to reduce the amount of machining in finishing the metal block, so that the metal block can be manufactured at a greatly improved productivity at a low cost.

According to a second aspect of the present invention, an endless metal belt for a metal belt type nonstep variable-speed transmission, extended between a drive pulley and a driven pulley included in the metal belt type nonstep variable-speed transmission, the respective effective diameters of the drive and the driven pulley being variable to change speed change ratio, comprises: thin metal rings layered in thicknesses to form two layered ring structures; and a plurality of metal blocks arranged along and supported on the two layered ring structures; wherein front and rear edges of opposite side surfaces of a neck part of each metal block are rounded in round edges of a radius $R_0$ of curvature, the thin metal rings has a thickness t, and the radius $R_0$ of curvature is not less than t/3.

In the endless metal belt according to the second aspect of the present invention, damaging of the flat middle part of the inner side surface of the thin metal ring can be avoided by properly determining the value of the radius $R_0$ of curvature of the rounded front and rear edges of opposite side surfaces of the neck part of each metal block in relation with the thickness t of the thin metal ring.

According to a third aspect of the present invention, an endless metal belt for a metal belt type nonstep variable-speed transmission, extended between a drive pulley and a driven pulley included in the metal belt type nonstep variable-speed transmission, the respective effective diameters of the drive and the driven pulley being variable to change the speed ratio, comprises: thin metal rings layered in thicknesses to form two layered ring structures; and a plurality of metal blocks arranged along and supported on the two layered ring structures; wherein $R_R$ is in the range of 0.04t/0.18 to 0.07t/0.18 and $R_0 \geq t/3$, where $R_R$ is the radius of curvature of the round side edges of the inner and the outer circumference of each of the thin metal rings, $R_0$ is the radius of curvature of the front and the rear round edge of opposite side surfaces of a neck part of each metal block and t is the thickness of the thin metal rings, the radius $R_0$ of curvature of the front and the rear round edge of opposite side surfaces of the neck part of each metal block is big when the radius $R_R$ of curvature of the round side edges of the inner and the outer circumference of each of the thin metal rings is big, and the radius $R_0$ of curvature of the front and the rear round edge of opposite side surfaces of the neck part of each metal block is small when the radius $R_R$ of curvature of the round side edges of the inner and the outer circumference of each of the thin metal rings is small.

According to a fourth aspect of the present invention, an endless metal belt for a metal belt type nonstep variable-speed transmission, extended between a drive pulley and a driven pulley included in the metal belt type nonstep variable-speed transmission, the respective effective diameters of the drive and the driven pulley being variable to change speed change ratio, comprises: thin metal rings layered in thicknesses to form two layered ring structures; and a plurality of metal blocks arranged along and supported on the two layered ring structures; wherein the side edges of the inner and the outer circumference of each of the thin metal rings are rounded in round edges of a radius $R_R$ of curvature, middle parts of the opposite side surfaces of each thin metal ring are flat, front and rear edges of opposite side surfaces of a neck part of each metal block are rounded in round edges of a radius $R_0$ of curvature, respectively, and the radius $R_R$ of curvature of the round side edges of the inner and the outer circumference of each thin metal ring and the radius $R_0$ of curvature of the front and the rear round edge of opposite side surfaces of the neck part of each metal block meet the following inequality.

$$R_R \leq 35R_0^3 - 12.7R_0^2 + 1.59R_0 + 0.01$$

Thus, the lest possible radius $R_0$ of curvature of the round edges of the side surface of the metal block is selected in relation with the radius $R_R$ of curvature of the round edges of the opposite side surfaces of the thin metal ring to reduce the amount of machining in finishing the metal block, so that the metal block can be manufactured at a greatly improved productivity at a low cost.

BRIEF DESCRIPTION OF THE DRAWINGS

The above and other objects, features and advantages of the present invention will become more apparent from the following description taken in connection with the accompanying drawings, in which:

FIG. 23 is a table tabulating values of corrected internal stress difference $\sigma_{a^*}$ and corrected contact stress difference $\sigma_{a^*HP}$ for different radius $R_R$ of curvature of round edges of the side surfaces of the innermost thin metal ring when the radius $R_0$ of curvature of round edges of the neck part of the metal block is 0.05 mm;

FIG. 24 is a table tabulating values of corrected internal stress difference $\sigma_{a^*}$ and corrected contact stress difference $\sigma_{a^*HP}$ for different radius $R_R$ of curvature of round edges of the side surfaces of the innermost thin metal ring when the radius $R_0$ of curvature of round edges of the neck part of the metal block is 0.07 mm;

FIG. 25 is a table tabulating values of corrected internal stress difference $\sigma a^*$ and corrected contact stress difference $\sigma_{a^*HP}$ for different radius $R_R$ of curvature of round edges of the side surfaces of the innermost thin metal ring when the radius $R_0$ of curvature of round edges of the neck part of the metal block is 0.15 mm; and FIG. 26 is a table tabulating values of corrected internal stress difference $\sigma_{a*}$ and corrected contact stress difference $\sigma_{a*HP}$ for different radius $R_R$ of curvature of round edges of the side surfaces of the innermost thin metal ring when the radius $R_0$ of curvature of round edges of the neck part of the metal block is 0.15 mm.

DESCRIPTION OF THE PREFERRED EMBODIMENTS

Figure 1:
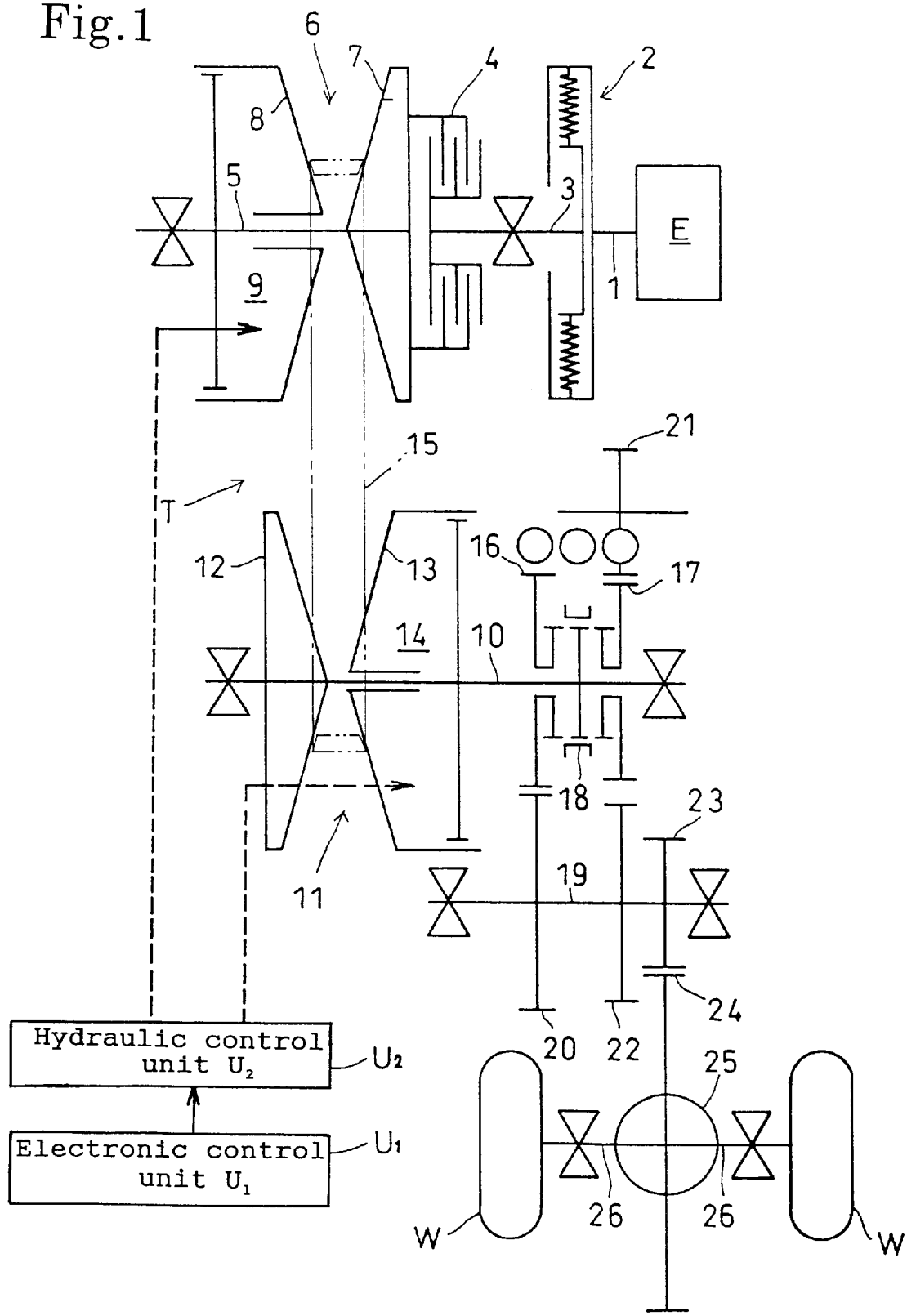
FIG. 1 is a diagrammatic view of a metal belt type nonstep variable-speed transmission provided with an endless metal belt in a preferred embodiment according to the present invention.

An endless metal belt in a first embodiment according to the present invention will be described with reference to FIGS. 1 to 10. Referring to FIG. 1, an input shaft 3 is connected through a damper 2 to the crankshaft 1 of an internal combustion engine E. The input shaft 3 is connected through a starter clutch 4 to a drive shaft 5 included in a metal belt type nonstep variable-speed transmission T. A drive pulley 6 mounted on the drive shaft 5 has a stationary part 7 formed integrally with the drive shaft 5 and a movable part 8 mounted on the drive shaft 5 so as to be movable toward and away from the stationary part 7. The movable part 8 is biased toward the fixed part 7 by fluid pressure applied to an oil chamber 9. A driven shaft 10 is supported in parallel to the drive shaft 5 and a driven pulley 11 is mounted on the driven shaft 10. The driven pulley 11 has a stationary part 12 formed integrally with the driven shaft 10 and a movable part 13 mounted on the driven shaft 10 so as to be movable toward and away from the stationary part 12. The movable part 13 is biased toward the stationary part 12 by fluid pressure applied to an oil chamber 14.

Figure 2:
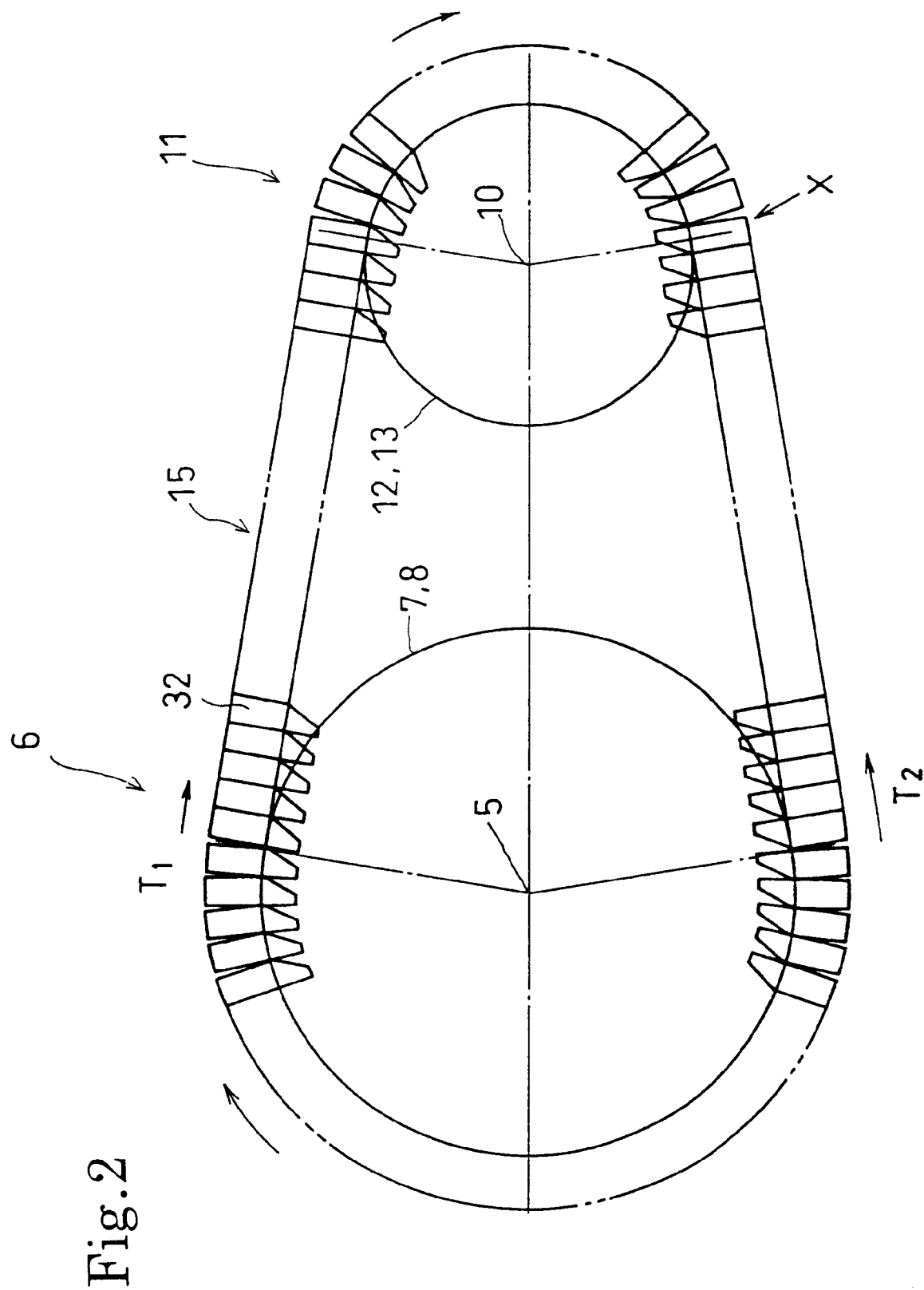
FIG. 2 is a schematic side elevation of a wrapping connector driving mechanism shown in FIG. 1.
Figure 3:
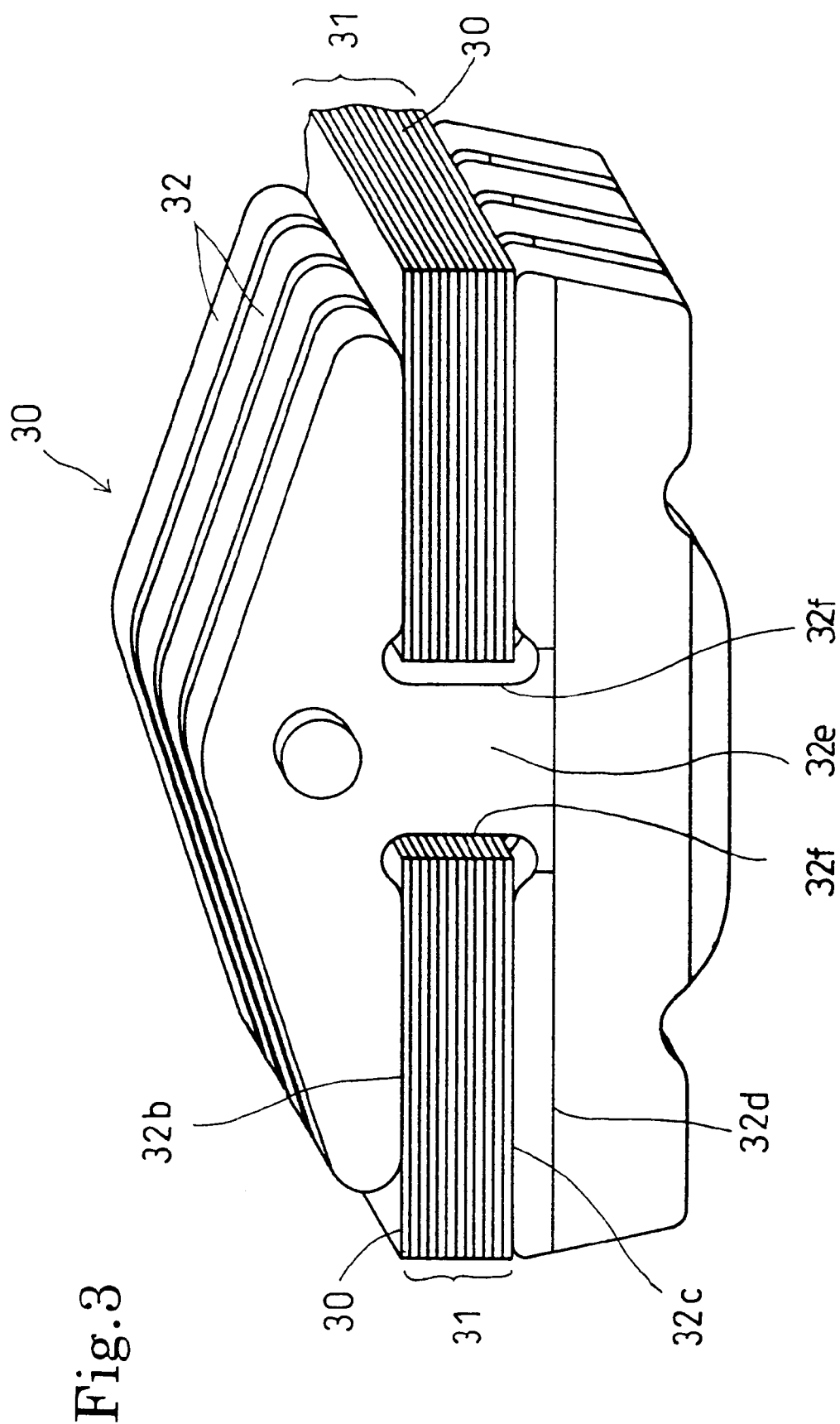
FIG. 3 is a fragmentary perspective view of the endless metal belt.
Figure 4:
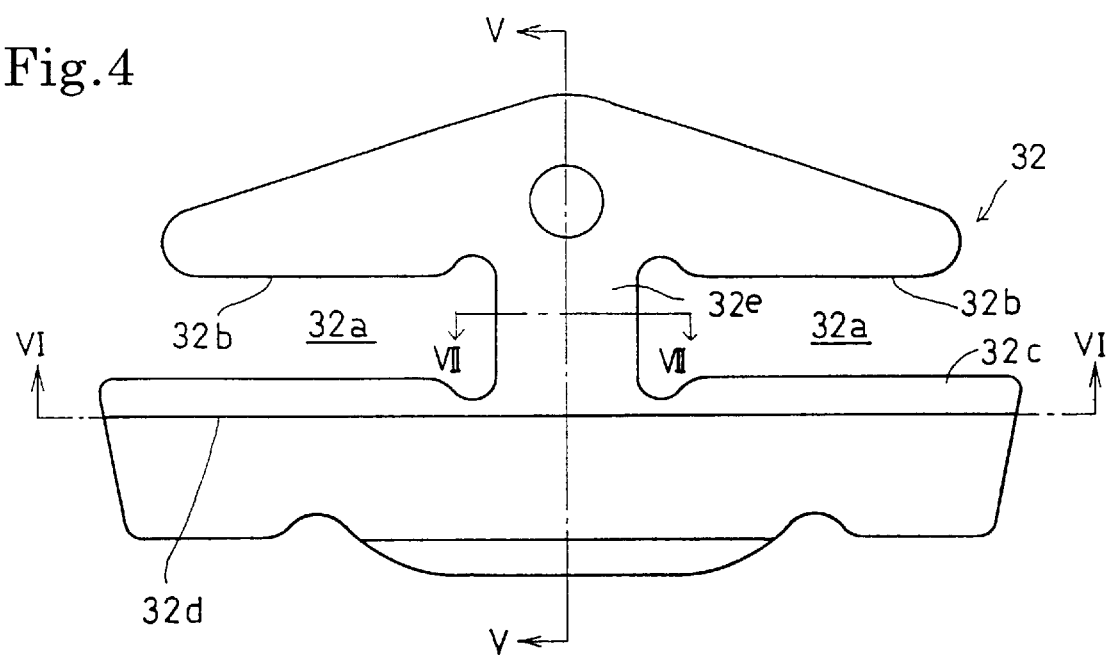
FIG. 4 is a front elevation of a metal block.
Figure 5:
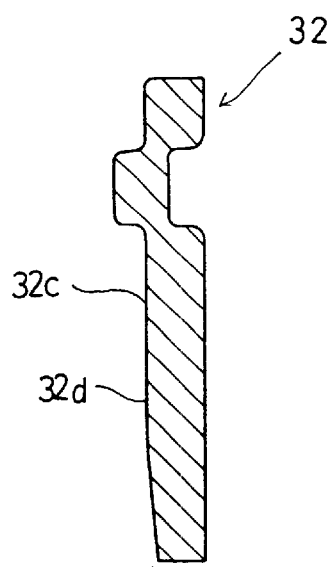
FIG. 5 is a sectional view taken on line V—V in FIG. 4.
Figure 6:
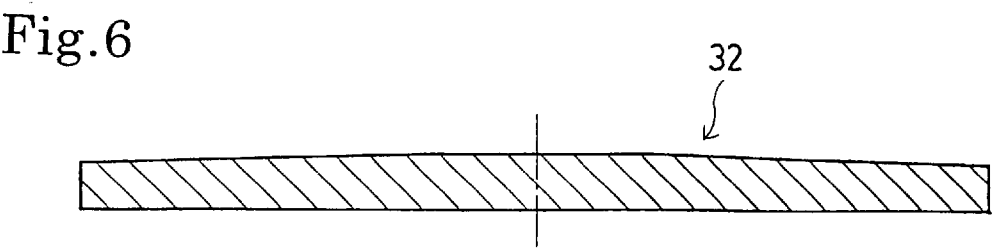
FIG. 6 is a sectional view taken on line VI—VI in FIG. 4.
Figure 7:
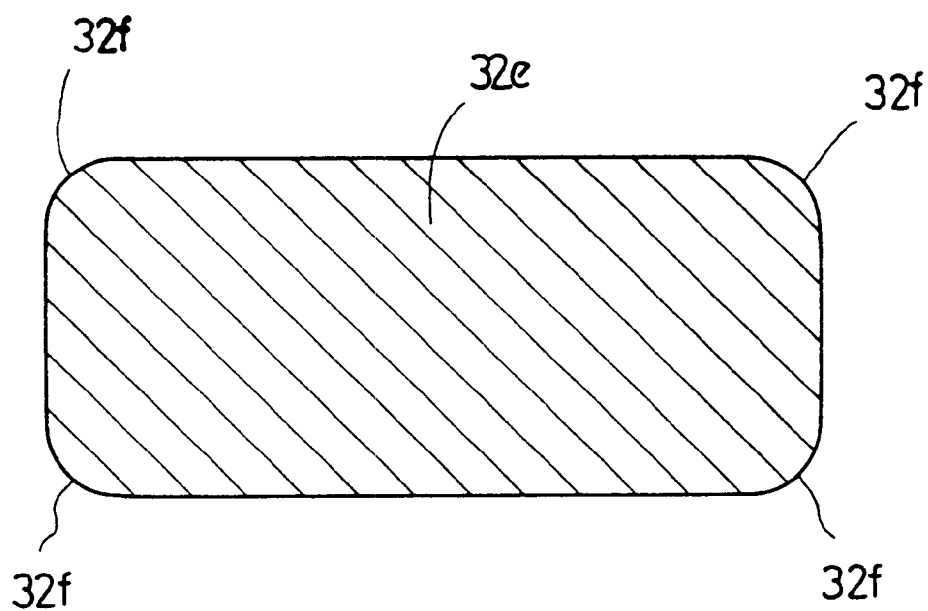
FIG. 7 is a sectional view taken on line VII—VII in FIG. 4.
Figure 8:
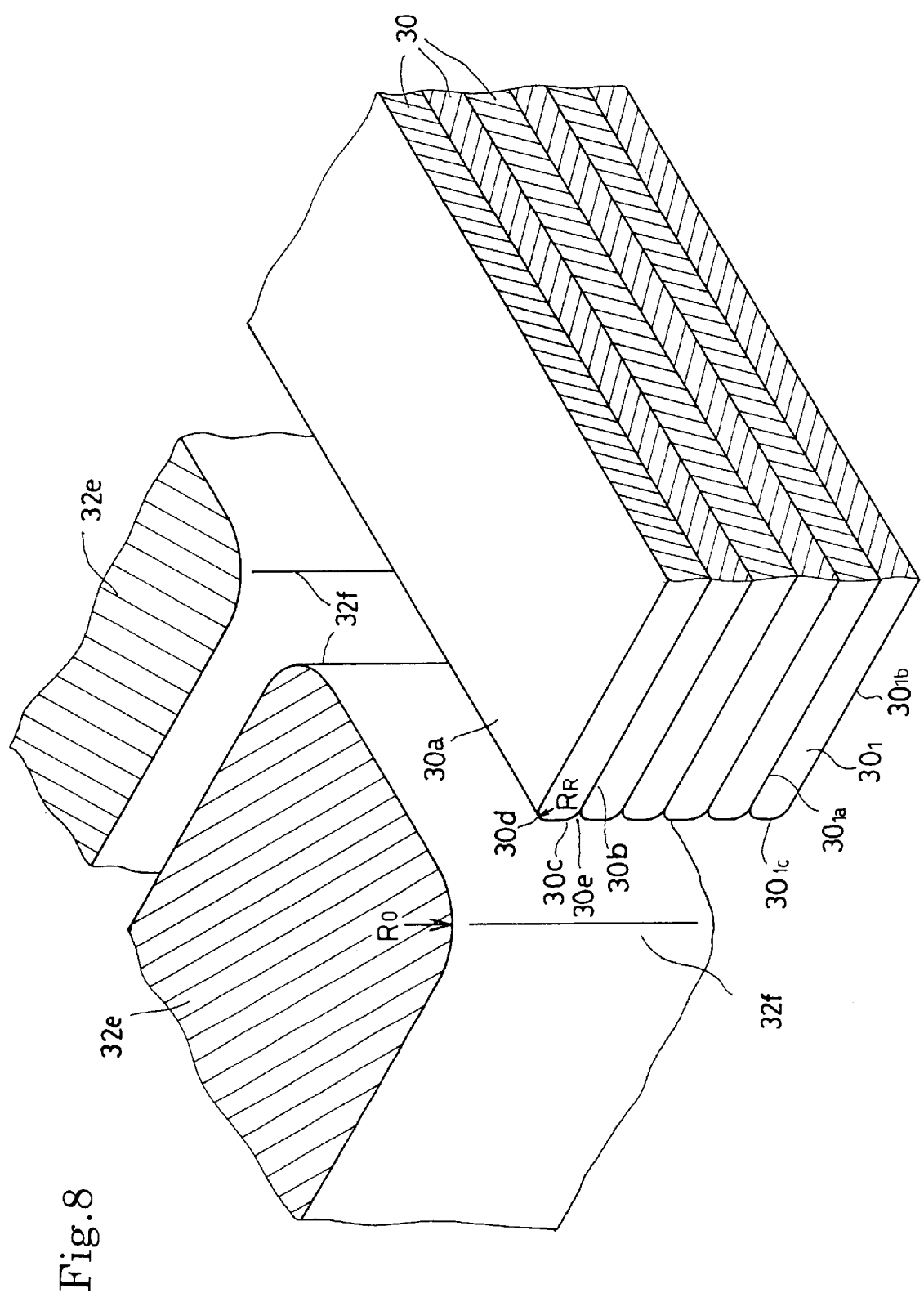
FIG. 8 is an enlarged, fragmentary perspective view of inner side parts of thin metal rings and neck parts of metal blocks.
Figure 9:
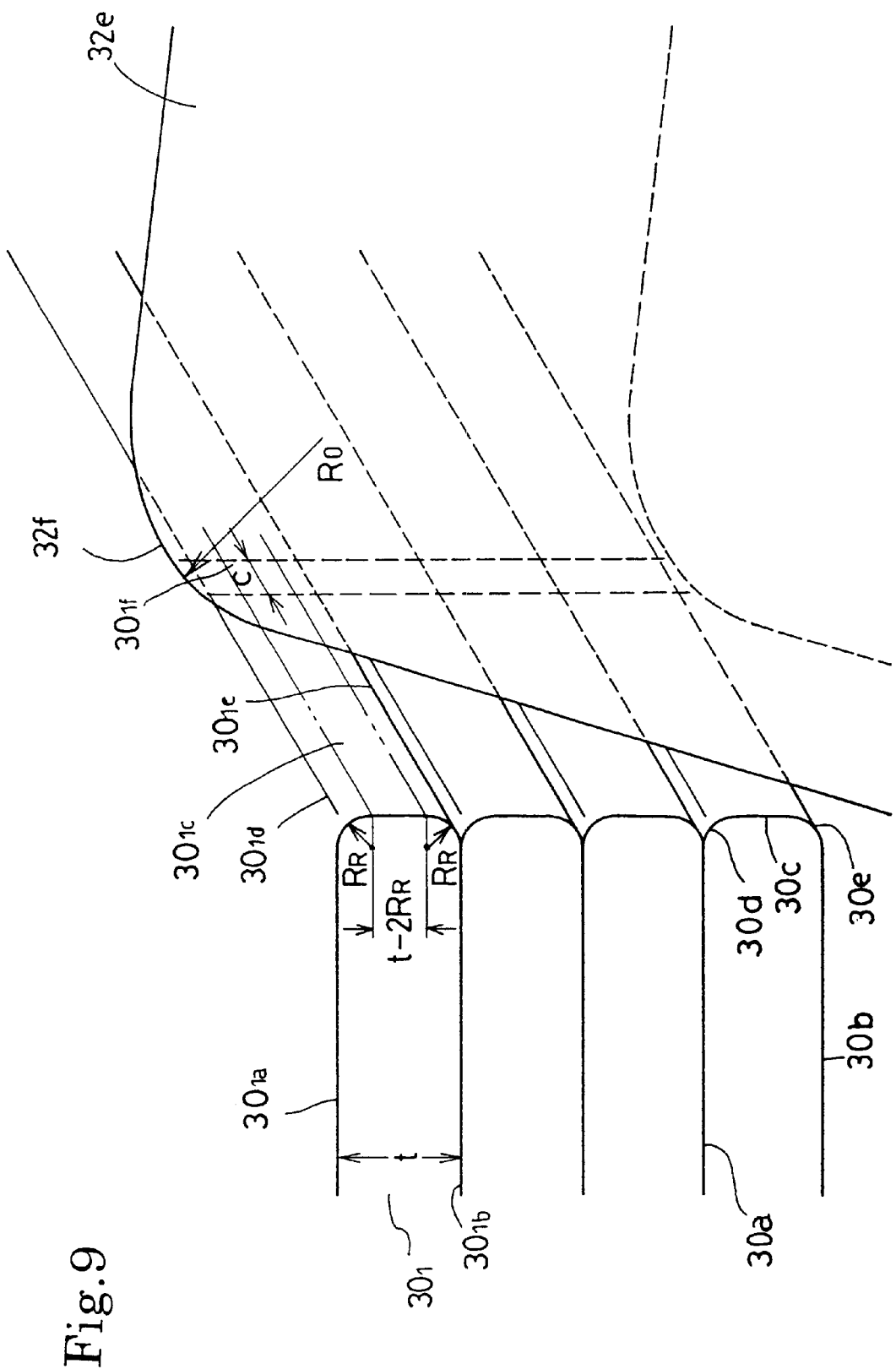
FIG. 9 is an enlarged perspective view of inner side parts of thin metal rings and the neck part of a metal block in contact with the inner side edges of the thin metal rings.

Referring to FIGS. 2 and 3, an endless metal belt 15 is formed by inserting a pair of layered ring structures 31 in slots 32a formed in opposite side parts of metal blocks 32. The endless metal belt 15 is extended between the drive pulley 6 and the driven pulley 11. Each layered ring structure 31 is formed by closely superposing twelve thin metal rings 30 of about 660 mm in circumference, abut 9.2 mm in width and about 0.18 mm in thickness. As shown in FIGS. 8 and 9, radially inner side edges at the intersections of the inner and the outer side surface 30c and the inner circumference 30a of each thin metal ring 30 are ground in radially inner round edges 30d of a shape substantially resembling a quarter of a circular cylinder of a radius $R_R$ of curvature, and the radially outer side edges at the intersections of the inner and outer side surface 30c and the outer circumference 30b of each thin metal ring 30 are ground in radially outer round edges 30e of a shape substantially resembling a quarter of a circular cylinder of a radius $R_R$ of curvature.

The two layered ring structures 31 are fitted in the slots 32 formed in the opposite side parts of the metal blocks 32. A rocking edge 32d is formed in the front surface 32c of each metal block 32. The side edges of a neck part 32e of each metal, block 32 are rounded in round side edges 32f of a shape substantially resembling a quarter of a circular cylinder of a radius $R_0$ of curvature.

A forward drive gear 16 and a reverse drive gear 17 are mounted on the driven shaft 10 so as to be rotatable relative to each other. The forward drive gear 16 and the reverse drive gear 17 are engaged with and disengaged from the driven shaft 10 selectively by a selector 18. An output shaft 19 is extended in parallel to the driven shaft 10. A forward driven shaft 20 and a reverse driven gear 22 are formed integrally with the output shaft 19. The output shaft 19 is driven for forward rotation through the forward driven gear 20 by the forward drive gear 16. The output shaft 19 is driven for reverse rotation through a reverse idle gear 21 and the reverse driven gear 22 by the reverse drive gear 17. A final drive gear 23 is formed integrally with the output shaft 19, and a final driven gear 24 engaged with the final drive gear 23 is combined with a differential gear 25. The differential gear 25 is connected to right and left wheels W by right and left axles 26. The driving force of the output shaft 19 is transmitted differentially through the final drive gear 23, the final driven gear 24, the differential gear 25 and the axles 26 to the right and the left wheel W.

The respective oil chambers 9 and 14 of the movable parts 8 and 13 are connected to a hydraulic control unit $U_2$ controlled by an electronic control unit $U_1$. When setting the metal belt type nonstep variable-speed transmission T to LOW, the electronic control unit $U_1$ gives a control signal to the hydraulic control unit $U_2$ to increase the fluid pressure in the oil chamber 14 of the driven pulley 11 and to decrease the fluid pressure in the oil chamber 9 of the drive pulley 6. Consequently, the effective diameter $D_{DN}$ of the driven pulley 11 increases continuously and the effective diameter $D_{DR}$ of the drive pulley 6 decreases continuously, so that the speed change ratio of the metal belt type nonstep variable-speed transmission T varies continuously to LOW. When setting the metal belt type nonstep variable-speed transmission T to OD, the electronic control unit $U_1$ gives a control signal to the hydraulic control unit $U_2$ to decrease the fluid pressure in the oil chamber 14 of the driven pulley 11 and to increase the fluid pressure in the oil chamber 9 of the drive pulley 6. Consequently, the effective diameter $D_{DN}$ of the driven pulley 11 decreases continuously and the effective diameter $D_{DR}$ of the drive pulley 6 increases continuously, so that the speed change ratio of the metal belt type nonstep variable-speed transmission T varies continuously to OD.

Stresses that will be induced in the thin metal rings 30 will be explained. When the layered ring structures 31 are extended between the drive pulley 6 and the driven pulley 11 and the drive pulley 6 is driven for clockwise rotation as shown in FIG. 2, a tensile stress $T_1$ is induced in one straight side of each layered ring structure 31 extending between the drive pulley 6 and the driven pulley 11 and a tensile stress $T_2$ is induced in the other straight side of the layered ring structure 31. The tensile stresses $T_1$ and $T_2$ are measured by a method mentioned in JP-A No. Hei 10-89429.

When the endless metal belt 15 formed by inserting the pair of layered ring structures 31 each formed by superposing n thin metal rings 30 (twelve thin metal rings 30) in the slots 32a of the metal blocks 32 is extended between the drive pulley 6 and the driven pulley 11, a tensile force difference $\Delta T_1$ acts on the innermost thin metal ring $30_1$.

$$\Delta T_1 = \{n(\xi-1)+1\}\Delta T_{all}/n\xi$$

where $\Delta T_{all}=(T_1-T_2)/2$, $\xi$ is friction coefficient ratio ($\mu_{SSM}/\mu_{SS}$), $\mu_{SSM}$ is the friction coefficient between the metal block 32 and the thin metal ring 30, $\mu_{SS}$ is the friction coefficient between the thin metal rings 30 and n is the number of the layered thin meal rings 30.

Figure 11:
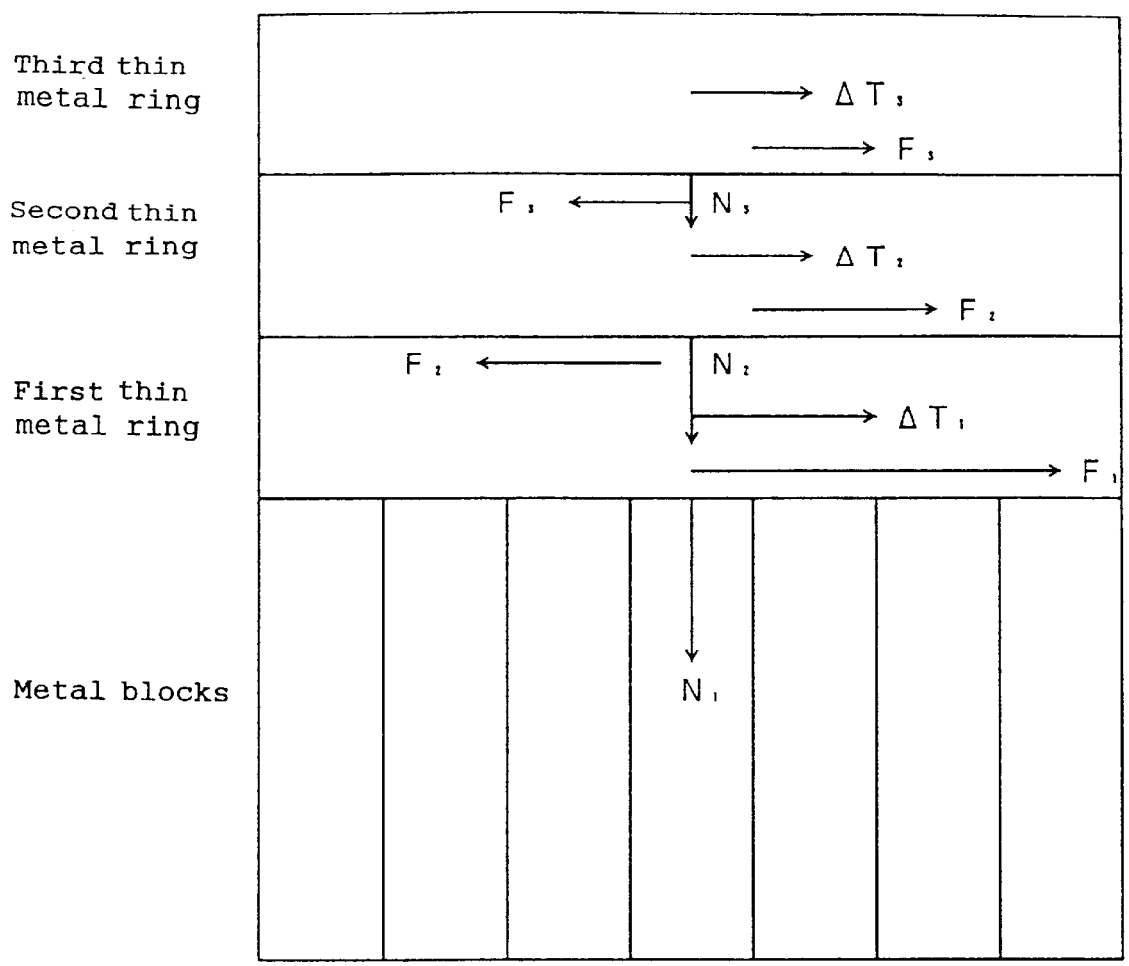
FIG. 11 is a diagrammatic view of resistance in explaining tensile force that acts on an innermost thin metal ring.

Referring to FIG. 11 showing a simple model of an endless metal belt having three thin metal rings, tensile force differences $\Delta T$ that contribute to tension change are:

$$\Delta T_3 = F_3 = \mu_{SS} N$$

$$\Delta T_2 = F_2 - F_3 = \mu_{SS} N$$

$$\Delta T_1 = F_1 - F_2 = 3\mu_{SSM} N - 2\mu_{SS} N$$

Thus, $\Delta T_1$ is different from $\Delta T_2$ and $\Delta T_3$.

$$\Delta T_1/\Delta T_2 = (3\mu_{SSM} N - 2\mu_{SS} N)/\mu_{SS} N = (3\mu_{SSM} - 2\mu_{SS})/\mu_{SS}$$

Therefore, when the number of the thin metal rings is n, $$\Delta T_1/\Delta T_2 = \{n\mu_{SSM}N - (n-1)\mu_{SS}N\}/\mu_{SS}N = \{n\mu_{SSM} - (n-1)\mu_{SS}\}/\mu_{SS} \quad (1)$$

$$= n\xi - (n-1) = n(\xi - 1) + 1$$

The tensile force difference $\Delta T_{all}$ in the entire layered ring structure 31 is:

$$\Delta T_{all} = \Delta T_1 + \Delta T_2 + \ldots + \Delta T_n = (n-1)\Delta T_2 + \Delta T_1$$

$$= (n-1)\Delta T_2 + \{n(\xi - 1) + 1\}\Delta T_2 = n\xi\Delta T_2$$

Therefore, $$\Delta T_2 = 1/n\xi\Delta T_{all} \quad (2)$$

By substituting Expression (2) into Expression (1), $$\Delta T_2 = 1/n\xi\Delta T_{all} \quad (2)$$

Figure 12:
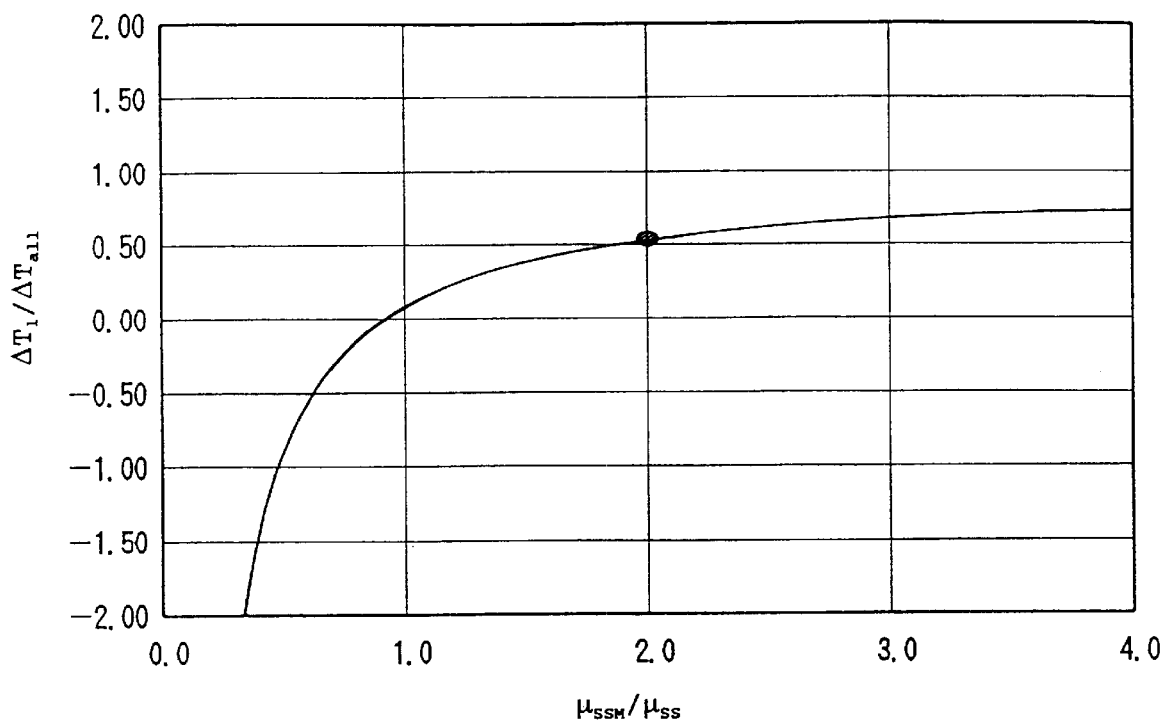
FIG. 12 is a graph of assistance in explaining the relation between tensile forces and friction coefficients.

FIG. 12 shows the relation between $\Delta T_1/\Delta T_{all}$ and $\mu_{SSM}/\mu_{SS}$ when n=12 calculated by using Expression (3)

The friction coefficient $\mu_{SSM}$ between the metal blocks 32 and the thin metal ring 30 and the friction coefficient $\mu_{SS}$ between the thin metal rings 30 determined through experiments were about 0.1 and about 0.05, respectively. Thus, $\mu_{SSM}/\mu_{SS}=\xi=2.0$.

The value of $\Delta T_1$ was calculated by using these values and Expression (3).

$$\Delta T_1/\Delta T_{all}=(12+1)/12\times 2=13/24\approx 0.54$$

From FIG. 12, $$\Delta T_1/\Delta T_{all}\approx 0.5$$

Thus, about 50% of the tensile force difference $\Delta T_{all}$ in the one layered ring structure 31 acts on the innermost thin metal ring $30_1$. The mean tensile force $T_1+T_2$ in the innermost thin metal ring $30_1$ is determined. From the mean tensile force difference $T_1-T_2$ and the mean tensile force $T_1+T_2$, the maximum tensile stress $\sigma_{TH}=T_1/2\times 12\times A\times t$ in the innermost thin metal ring $30_1$ moving from the drive pulley 6 toward the driven pulley 11 and the minimum tensile stress $\sigma_{TL}=T_2/2\times 12\times A\times t$ in the innermost thin metal ring $30_1$ moving from the driven pulley 11 toward the drive pulley 6, where A is the width and t is the thickness of the thin metal ring 30, are determined.

Figure 13:
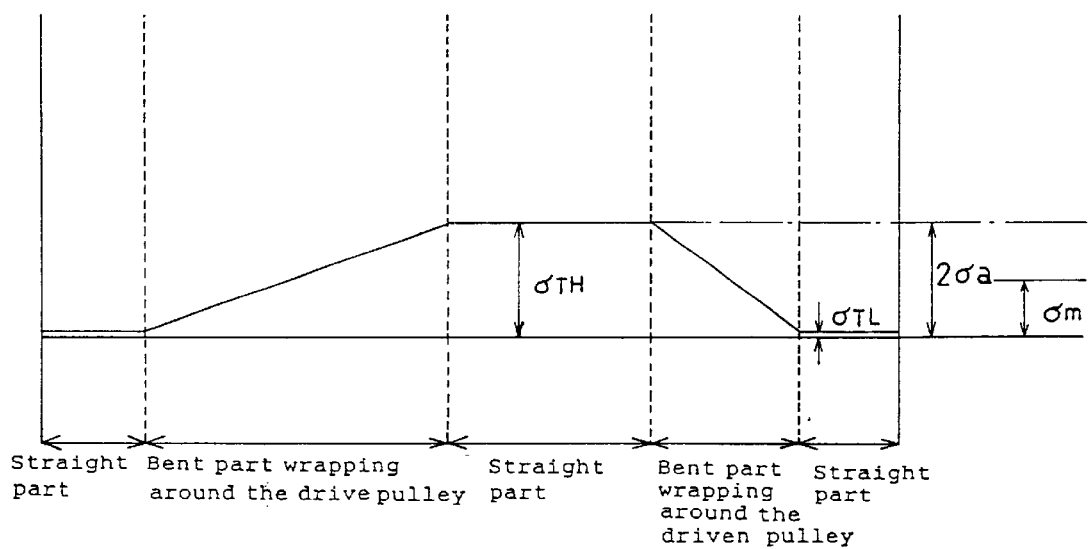
FIG. 13 is a graph showing the distribution of internal stress in a middle part with respect to thickness of the innermost thin metal ring.

FIG. 13 is a graph showing the distribution of tensile stress $\sigma_T$ in a middle part with respect to thickness of the innermost thin metal ring $30_1$, in which the length of the innermost thin metal ring $30_1$ is measured on the horizontal axis and the stress in the middle part of the innermost thin metal ring $30_1$ is measured on the vertical axis (tensile stress and compressive stress are measured upward and downward from the horizontal axis, respectively). In the graph shown in FIG. 13, the difference between the maximum and the minimum stress is $2\sigma_a$, where $\sigma_a$ is stress difference, and the mean of the maximum and the minimum stress is the mean stress $\sigma_m$.

The thin metal rings 30 are in a circle of a radius R' when the same are not extended between the drive pulley 6 and the driven pulley 11 and are in an unloaded state. When the thin metal rings 30 are extended between the drive pulley 6 and the driven pulley 11, parts of the innermost thin meal ring $30_1$ wound around the drive pulley 6 and the driven pulley 11 are curved in arcs of circles of radii $R_{RD}$ and $R_{DN}$, respectively, and parts of the innermost thin metal ring $30_1$ extending between the drive pulley 6 and the driven pulley 11 are stretched straight. Consequently, bending stresses $\sigma_{VDR}=Et\{(1/R_{DR})-(1/R')\}$ and $\sigma_{VDN}=Et\{(1/R_{DN})-(1/R')\}$ (plus sign indicates tensile stress and minus sign indicates compressive stress) are induced in a part contiguous with the outer circumference of the innermost thin metal belt $30_1$ wound around the drive pulley 6 and a part contiguous with the inner circumference of the innermost thin metal ring $30_1$ wound around the driven pulley 11, respectively. A bending stress $\sigma_{V1}=Et(1/R')$ is induced in a part contiguous with the outer circumference of the innermost thin metal ring $30_1$ extending between the drive pulley 6 and the driven pulley 11.

Figure 14:
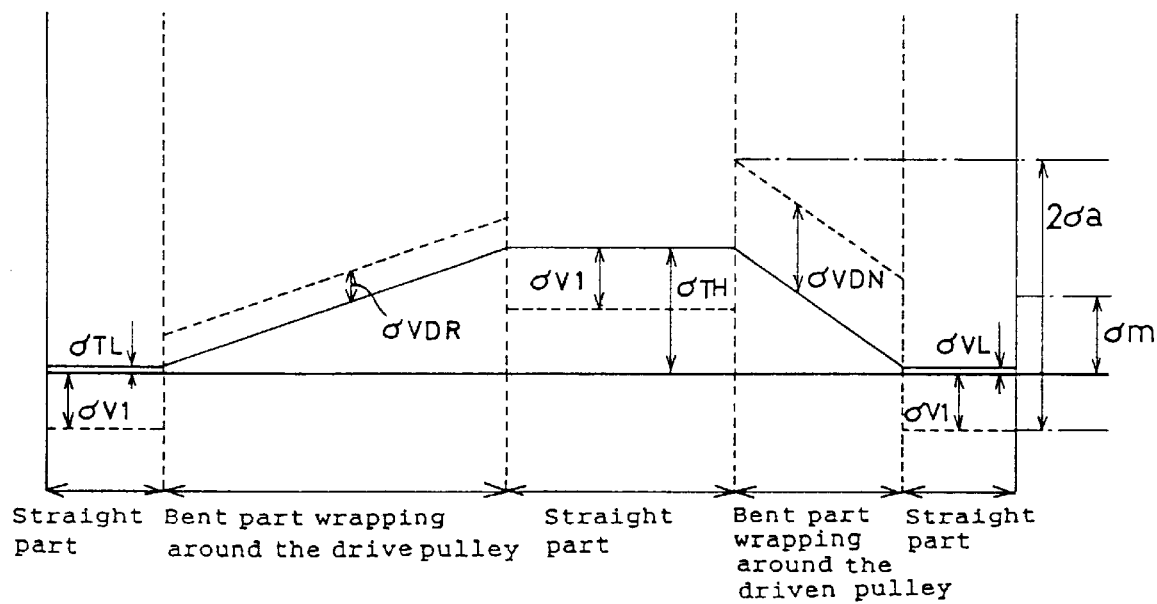
FIG. 14 is a graph showing the distribution of internal stress in the outer circumference of the innermost thin metal ring.

FIG. 14 shows the variation of the stress induced in the part contiguous with the outer circumference of the innermost thin metal ring $30_1$ along the length of the innermost thin metal ring $30_1$. In the graph shown in FIG. 14, dotted lines indicate the sum of addition of $\sigma_T$ and $\sigma_{VDR}$ in the part wound around the drive pulley 6, the sum of addition of $\sigma_T$ and $\sigma_{VDN}$ in the part wound around the driven pulley 11, the remainder of subtraction of $\sigma_{V1}$ from $\sigma_{TH}$ in the straight part, and the remainder of subtraction of $\sigma_{V1}$ from $\sigma_{TL}$ in the straight part, respectively.

Figure 15:
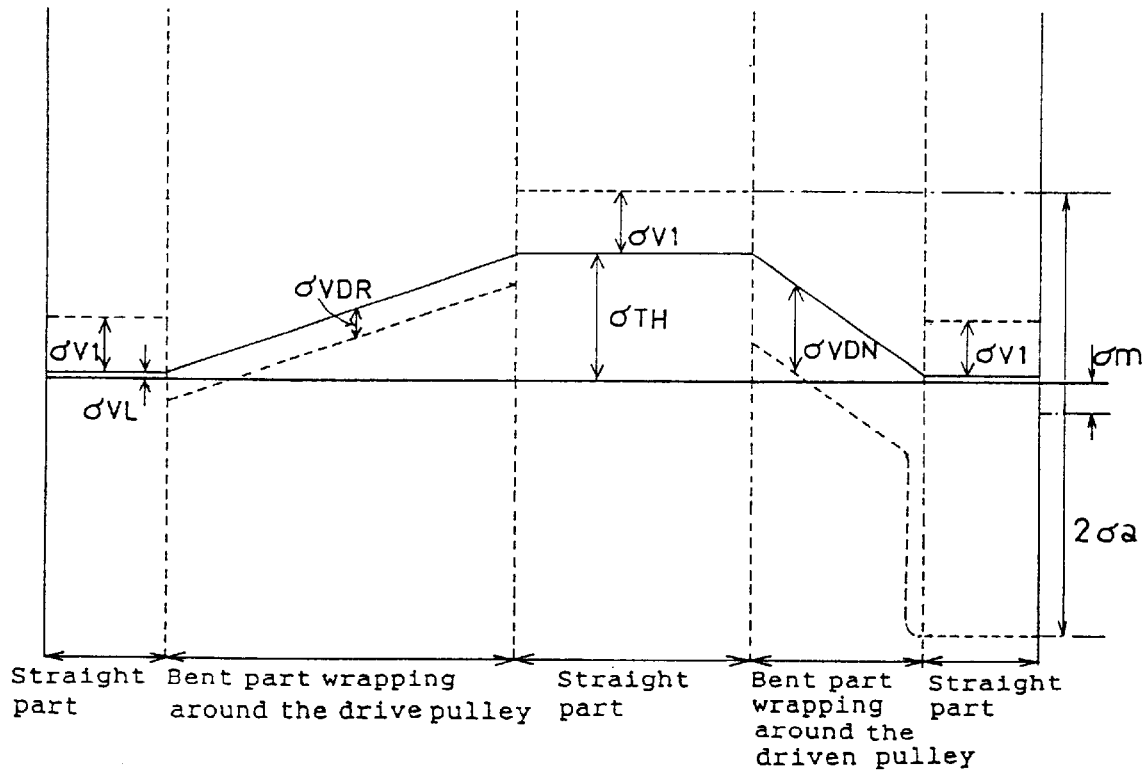
FIG. 15 is a graph showing the distribution of internal stress in the inner circumference of the innermost thin metal ring.

FIG. 15 shows the variation of the stress induced in the part contiguous with the inner circumference of the innermost thin metal ring $30_1$ along the length of the innermost thin metal ring $30_1$. In the graph shown in FIG. 11, dotted lines indicates the remainder of subtraction of $\sigma_{VDR}$ (compressive stress) from $\sigma_T$ in the part wound around the drive pulley 6, the remainder of subtraction of $\sigma_{VDN}$ (compressive stress) from $\sigma_T$ in the part wound around the driven pulley 11, the sum of addition of $\sigma_{V1}$ and $\sigma_{TH}$ in the straight part, and the sum of addition of $\sigma_{V1}$ and $\sigma_{TL}$ in the straight part, respectively.

Figure 10:
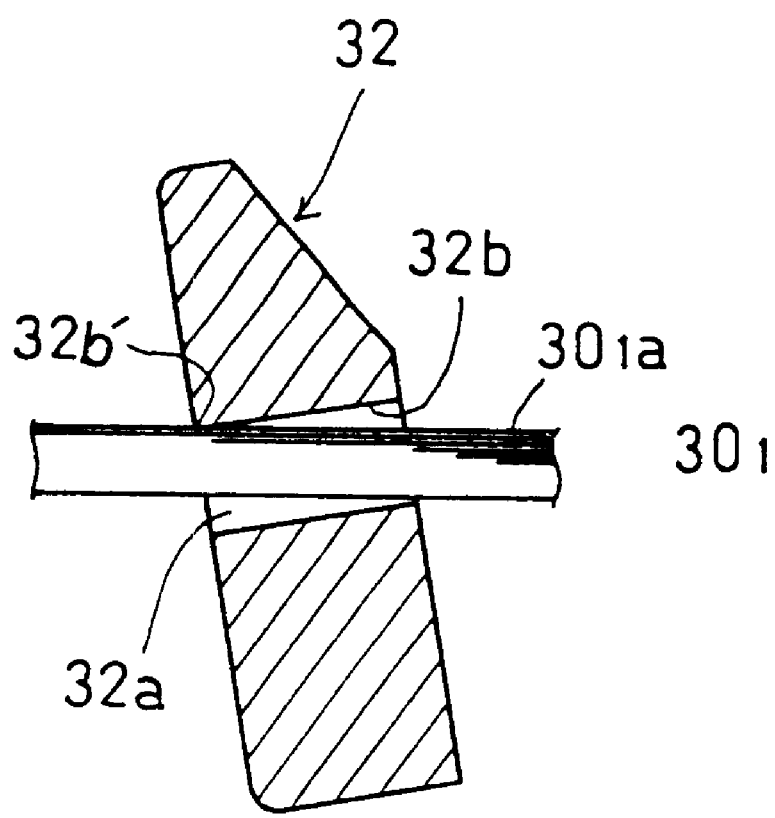
FIG. 10 is a sectional view of a metal block and a layered ring structure engaged in a slot formed in the metal block, showing a state where the lower rear edge of the slot is biting the inner circumference of the innermost thin metal ring.

As shown in FIG. 15, the stress $\sigma_{VDN}$ in a part X (FIG. 2) of the innermost thin metal ring $30_1$ leaving the driven pulley 11 drops sharply because the rear edge 32b' of the inner side surface 32b of the slot 32a of the metal block 32 bites the inner circumference $30_{1a}$ of the innermost thin metal ring $30_1$ as shown in FIG. 10 and a large, local contact stress is induced.

A description will be given of contact stress that will be induced in the inner side surface 30c of the thin metal ring 30 when the metal block turns about an axis perpendicular to the inner circumference 30a and the outer circumference 30b of the thin metal ring 30 and the round side edge 32f of the neck part 32e of the metal block 32 is pressed against the inner side surface 30c of the thin metal ring 30 to apply a force Q to the inner side surface 30c of the thin metal ring 30.

Referring to FIG. 9, when the round side edge 32f of the neck part 32e of the metal block 32 comes into contact with the inner side surface 30c of the thin metal ring 30, the contact length of a contact part 30f of the inner side surface 30c of the inner side surface 30c of the thin metal ring 30 is $t-2R_R$, where t is the thickness of the thin metal ring, and the circumferential width of the contact part 30f of the inner side surface 30c of the thin metal ring 30 is C. A contact stress induced in the contact part 30f is expressed by the following expression called Hertz formula.

$$\sigma_{hN}=Q/\pi\cdot 12\cdot (t-2R_R)C+EC/4(1-V^2)R_0 \quad (4)$$

where E is the elastic modulus of the thin metal ring 30 and the metal block 32 and V is the Poisson ratio of the thin metal ring 30 and the metal block 32.

Figure 16:
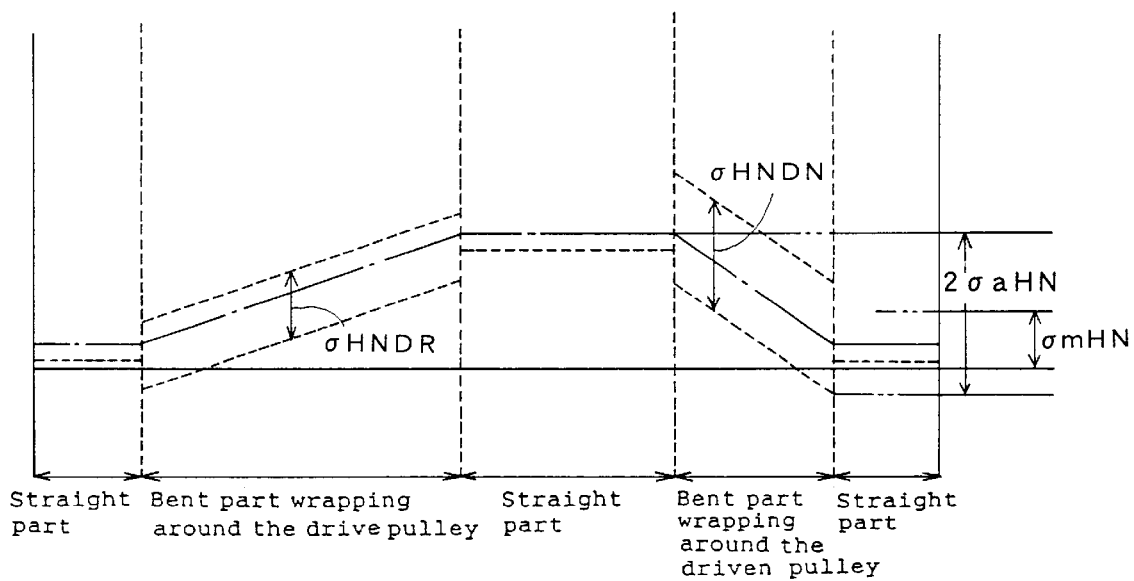
FIG. 16 is a graph showing the distribution of contact stress in a state where the inner side surface of a thin metal ring is in contact with the neck part of a metal block.

FIG. 15 shows the variation of the stress acting on the inner circumference $30_1a$ of the innermost thin metal ring $30_1$. FIG. 16 is a graph obtained by adding the contact stress $\sigma_{hN}$ induced by the round side edge 32f of the neck part 32e of the metal block 32 in contact with the innermost thin metal ring $30_1$ to a stress induced in a part of the innermost thin metal ring $30_1$ at a distance h from the inner circumference $30_1a$ toward the outer circumference $30_1b$.

Generally, the fatigue strength of a metal is related with the stress difference $\sigma_a$ between a maximum stress and a minimum stress, and the mean stress $\sigma_m$. The fatigue strength of a steel is dependent on corrected internal stress difference $\sigma_{a*}$ expressed by:

$$\sigma_{a*} = \sigma_a + \sigma_m/3 \qquad (5)$$

Contact part corrected stress difference $\sigma_{a*HN}$ in the contact part of the inner side surface 30a of the innermost thin metal ring in contact with the round side edge 32f of the neck part 32e of the metal block 32 is expressed by:

$$\sigma_{a*HN} = \sigma_{aHN} + \sigma_{mHN}/3 \qquad (6)$$

Table 1 shown in FIG. 23 tabulates calculated values of the corrected internal stress difference $\sigma_{a*}$ and contact part corrected stress difference $\sigma_{a*HN}$ when the radius $R_0$ of curvature of the round side edge 32f of the neck part 32e of the metal block 32 is 0.05 mm. In Table 1, values for the radius $R_R$ of curvature of the round edge of the thin metal ring 30 are 0.01, 0.02, 0.03, 0.04, 0.05, 0.06, 0.07, 0.08 and 0.09 mm, and the height h from the inner circumference 30a of the thin metal ring 30 is changed. Pulley Hertz compressive stresses $\sigma_{hN(DR)}$ and $\sigma_{hN(DN)}$ at the height h are calculated by using Expression (4).

Internal stresses (the stress difference $\sigma_a$, the mean stress $\sigma_m$ and the corrected stress difference $\sigma_{a*}$) in a part at the height h in the thin metal ring 30 are determined by methods similar to those mentioned above.

The internal stresses in the thin metal ring 30 and the pulley Hertz compressive stresses are combined to determine neck contact stresses (contact part stress difference $\sigma_{aHN}$, the mean neck contact stress $\sigma_{mHN}$ and the contact part corrected stress difference $\sigma_{a*HN}$) in the contact part of the thin metal ring 30 in contact with the round side edge 32f of the neck part 32e of the metal block 32 as shown in FIG. 16.

Figure 17:
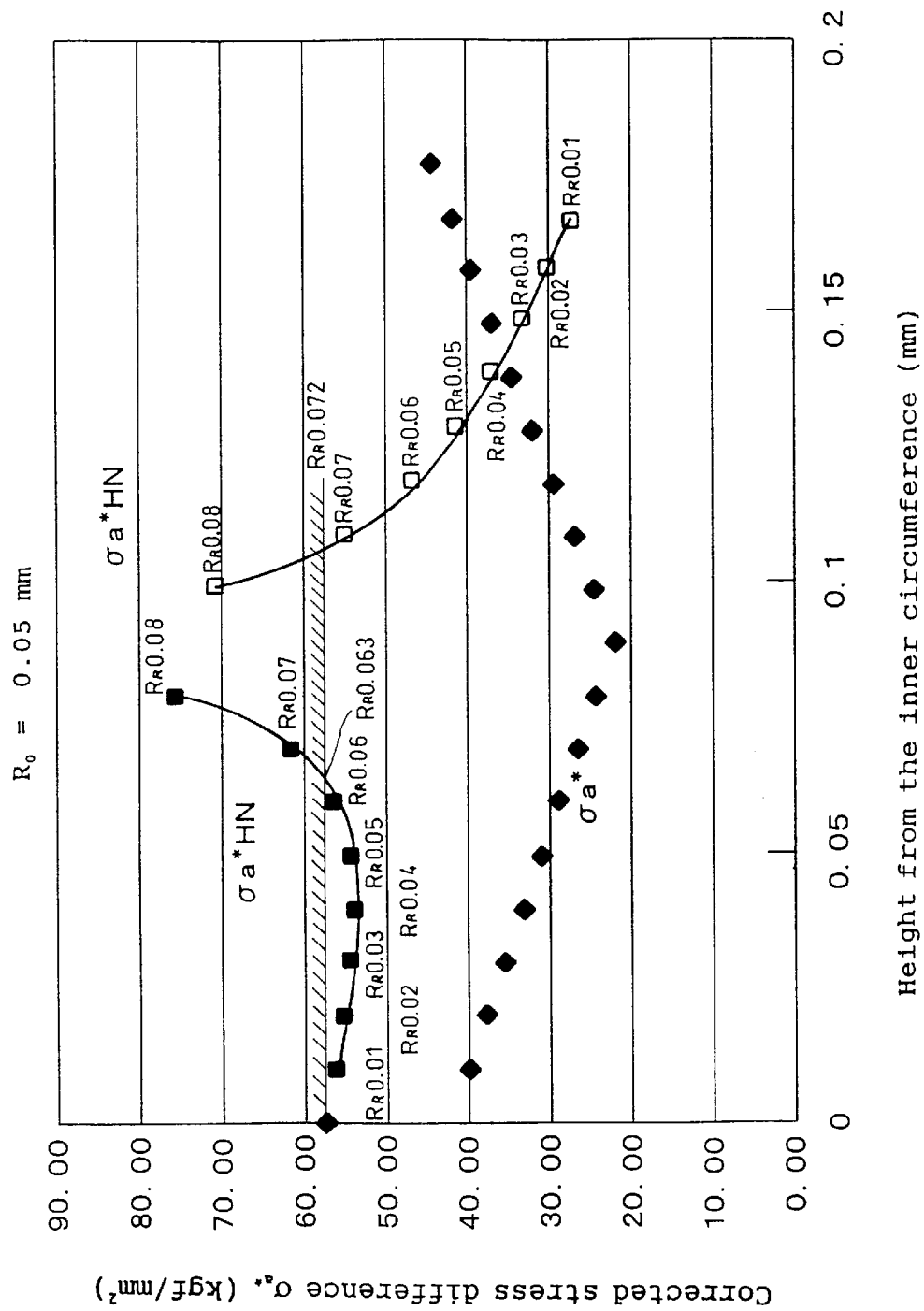
FIG. 17 is a graph showing the relation between corrected internal stress difference $\sigma^*$ of the innermost thin metal ring and corrected contact stress difference $\sigma^*_{HP}$ of a part of the innermost thin metal ring in contact with the neck part of the metal block, when the radius $R_0$ of curvature of round edges of the neck part of the metal block is 0.05 mm.

FIG. 17 shows the variation of the contact part corrected stress difference $\sigma_{a*HN}$ with the height h, in which the corrected internal stress difference $\sigma_{a*}$ and the contact part corrected stress difference $\sigma_{a*HN}$ are measured on the vertical axis and the height h is measured on the horizontal axis. As obvious from FIG. 17, the contact part corrected stress difference $\sigma_{a*HN}$ is greater than the corrected internal stress difference $\sigma_{a*}$ in the part contiguous with the inner circumference 30a in which the corrected internal stress difference $\sigma_{a*}$ is the greatest when the radius $R_R$ of curvature of the inner round edge 30d and the outer side edge 30e of the thin metal ring 30 in contact with the round side edge 32f of the neck part 32e of the metal block 32 is greater than one of 0.063 mm (h=0.063 mm) and 0.072 mm (h=0.1008 mm). The contact part corrected stress difference $\sigma_{a*HN}$ is smaller than the corrected internal stress difference $\sigma_{a*}$ when the radius $R_R$ is smaller than 0.063 mm on the inner side of the middle of the thickness of the thin metal ring 30 or smaller than 0.072 mm on the outer side of the middle of the thickness of the thin metal ring 30. The start of fatigue failure of the inner round edge 30c that comes into contact with the round side edge 32f of the neck part 32e of the metal block 32 before the starts of fatigue failure of the inner circumference 30a of the thin metal ring can be prevented by forming the inner round edges 30e and 30g of the thin metal ring 30 in the radius $R_R$ of curvature not greater than 0.06 mm when the radius $R_0$ of curvature of the round side edge 32f of the neck part 32e of the metal block 32 is 0.05 mm.

Figure 18:
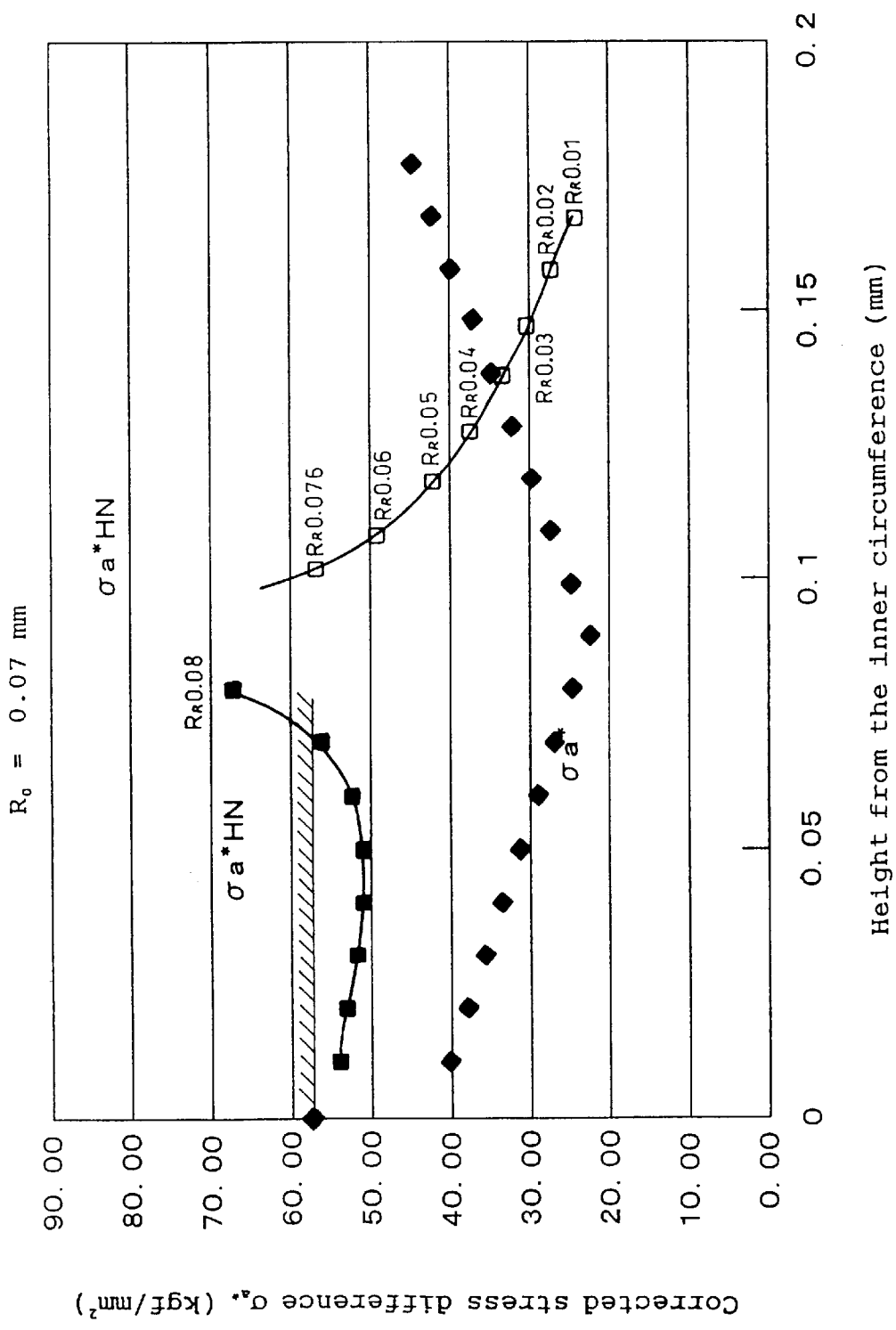
FIG. 18 is a graph showing the relation between corrected internal stress difference $\sigma^*$ of the innermost thin metal ring and corrected contact stress difference $\sigma^*_{HP}$ of a part of the innermost thin metal ring in contact with the neck part of the metal block, when the radius $R_0$ of curvature of round edges of the neck part of the metal block is 0.07 mm.
Figure 19:
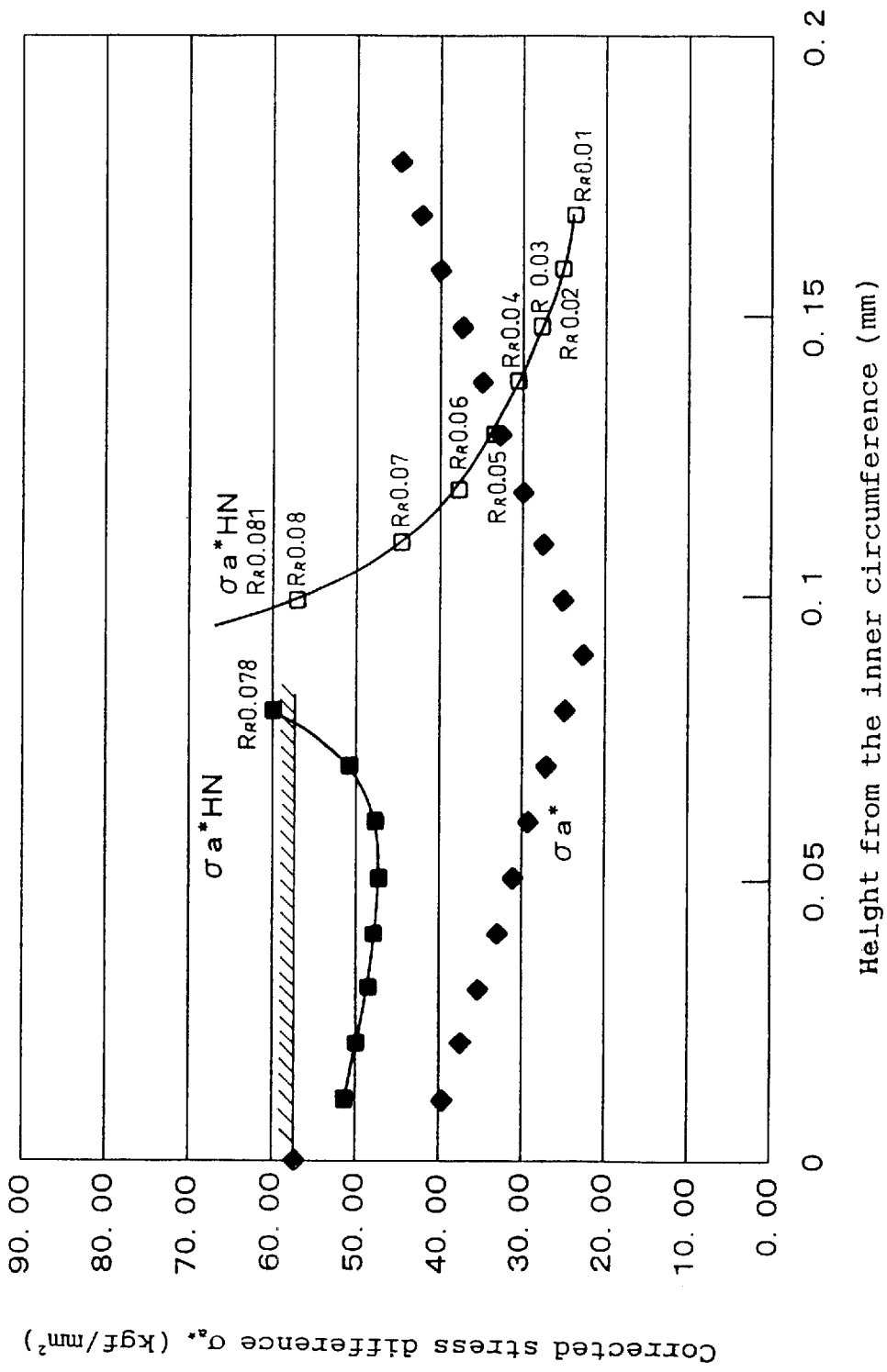
FIG. 19 is a graph showing the relation between corrected internal stress difference $\sigma^*$ of the innermost thin metal ring and corrected contact stress difference $\sigma^*_{HP}$ of a part of the innermost thin metal ring in contact with the neck part of the metal block, when the radius $R_0$ of curvature of round edges of the neck part of the metal block is 0.10 mm.
Figure 20:
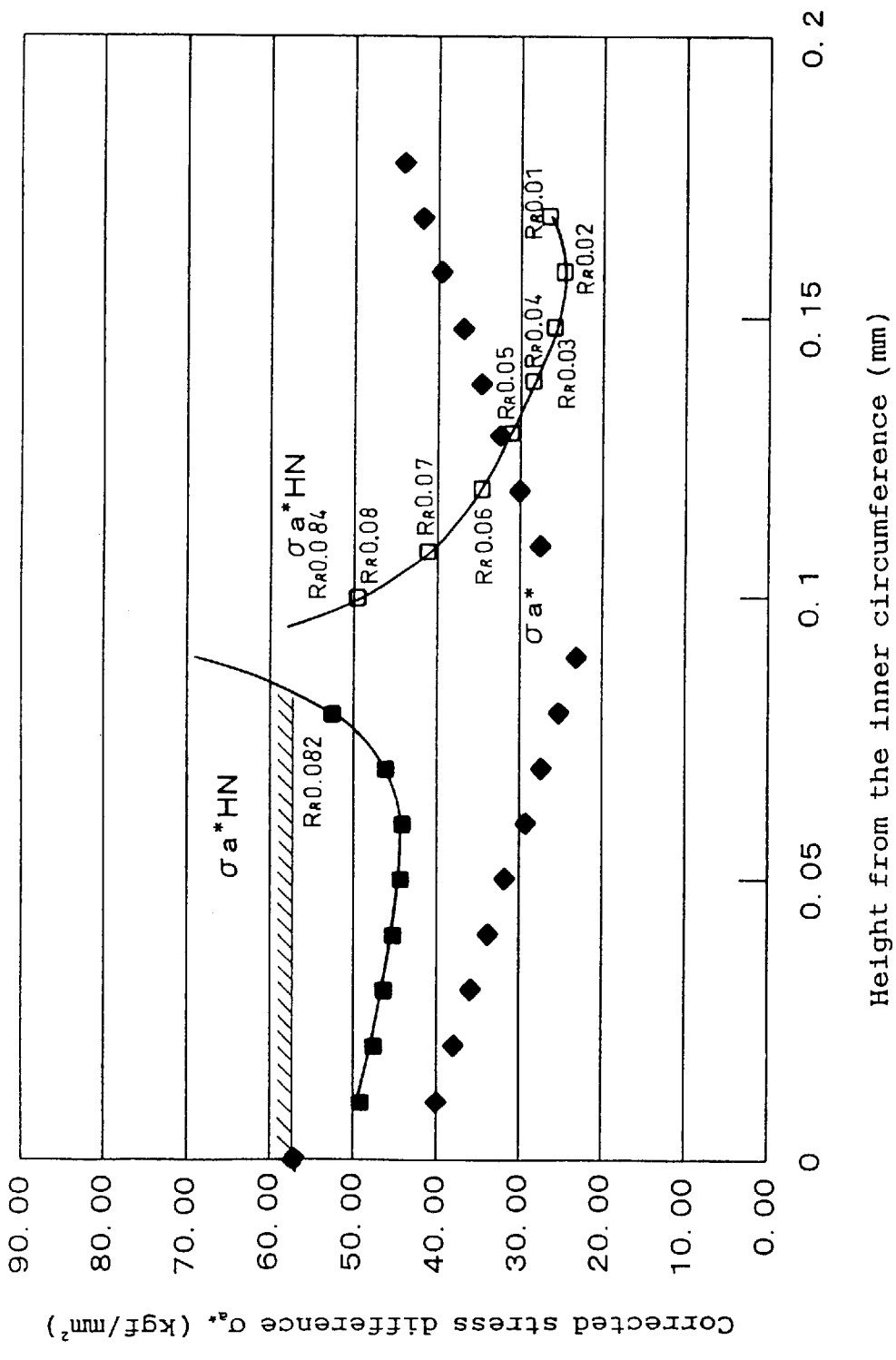
FIG. 20 is a graph showing the relation between corrected internal stress difference $\sigma^*$ of the innermost thin metal ring and corrected contact stress difference $\sigma^*_{HP}$ of a part of the innermost thin metal ring in contact with the neck part of the metal block, when the radius $R_0$ of curvature of round edges of the neck part of the metal block is 0.15 mm.

The aforesaid values are calculated on an assumption that the radius $R_0$ of curvature of the round side edge 32f of the neck part 32e of the metal block 32 is 0.05 mm. Values of the neck contact stress in the part of the thin metal ring 30 in contact with the round side edge 32f of the metal block 32 when the radius $R_0$ of curvature is 0.07, 0.10 and 0.15 mm are tabulated in Tables 2, 3 and 4 shown in FIGS. 24, 25 and 26, respectively. Values of the contact part stress difference $\sigma_{a*HN}$ and the corrected internal stress difference $\sigma_{a*}$ are shown in graphs shown in FIGS. 18, 19 and 20.

Figure 21:
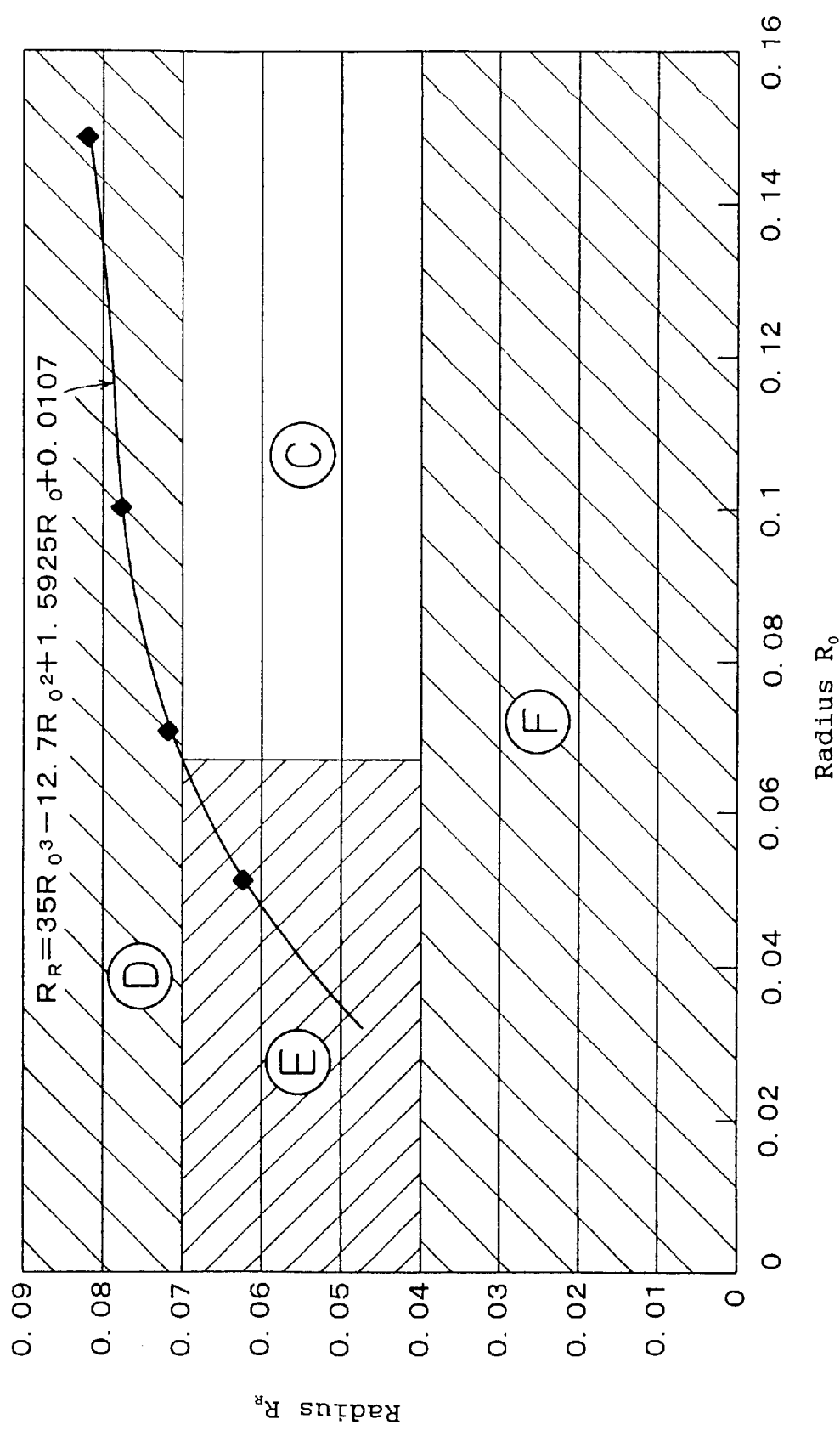
FIG. 21 is a graph showing the relation between the radius $R_0$ of curvature of the round edges of the neck part of the metal block and the radius $R_R$ of curvature of the round side edges of the thin metal ring.

FIG. 21 is a graph showing the relation between the radius $R_0$ of curvature of the round side edge 32f of the neck part 32e of the metal ring 32 and the radius $R_R$ of curvature of the inner side edges 30d and 30e of the thin metal ring 30 that makes the corrected internal stress difference $\sigma_{a*}$ in the inner circumference 30a of the thin metal ring 30 equal to the contact part corrected stress difference $\sigma_{a*NH}$, in which the radius $R_R$ is measured on the vertical axis and the radius $R_0$ is measured on the horizontal axis. The relation between $R_R$ and $R_0$ is expressed by Expression (7).

$$R_R = 35R_0^3 - 12.7R_0^2 + 1.5925R_0 + 0.0107 \qquad (7)$$

Figure 22:
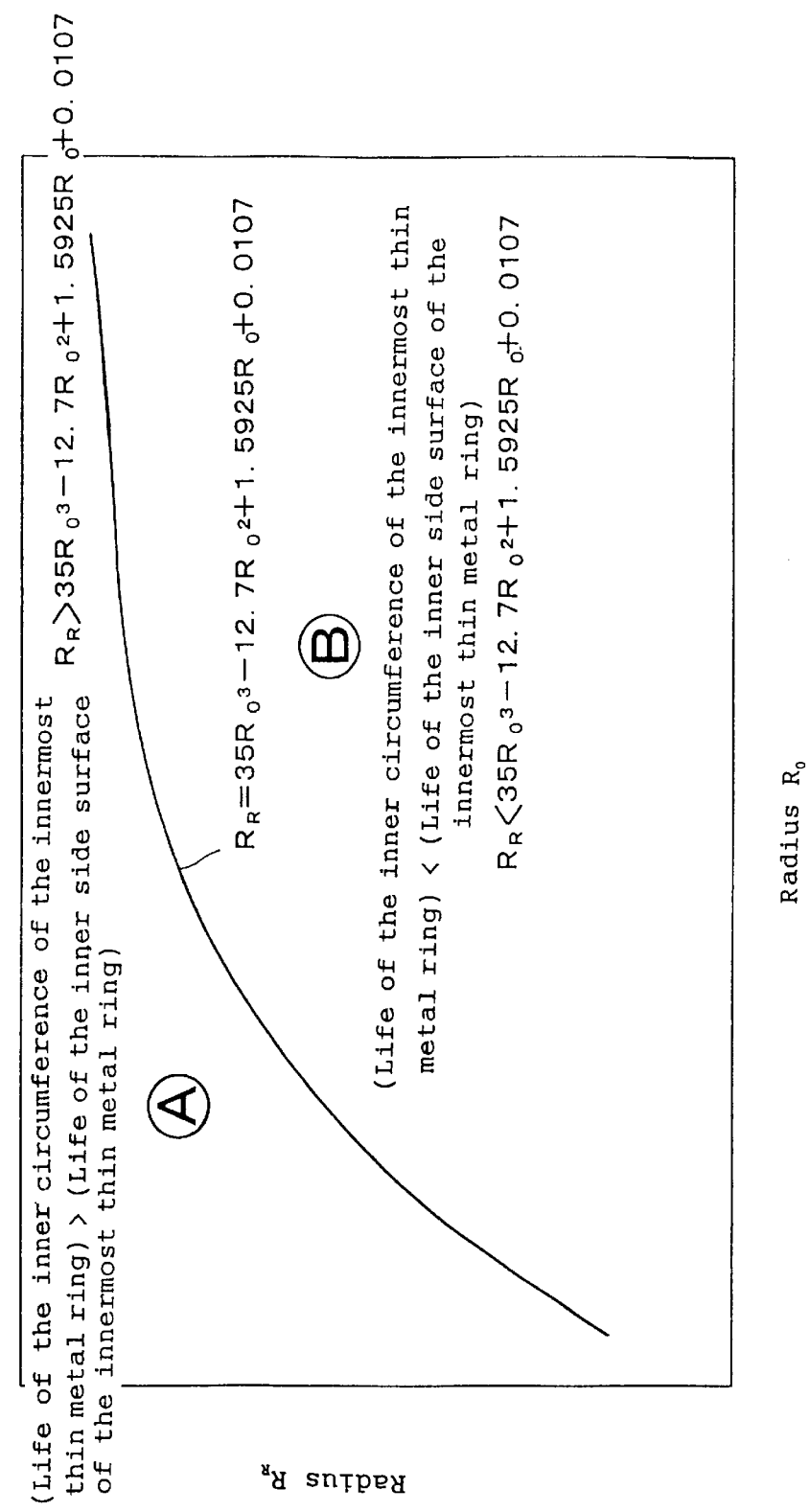
FIG. 22 is a graph showing a curve representing a boundary between a region A where $R_R > 35R_0^3 - 12.7R_0^2 + 1.5925R_0 + 0.0107$ and a region B where $R_R < 35R_0^3 - 12.7R_0^2 + 1.5925R_0 + 0.0107$.

As shown in FIG. 22, a region A in which the radii $R_R$ and $R_0$ meet a condition expressed by an inequality:

$$R_R > 35R_0^3 - 12.7R_0^2 + 1.5925R_0 + 0.0107 \qquad (8)$$

is a preferable region in which the life of the inner side surface 30c of the thin metal ring 30 is shorter than that of the inner circumference $30_1a$ of the innermost thin metal ring $30_1$. In a region B in which the radii $R_R$ and $R_0$ meet a condition expressed by an inequality:

$$R_R < 35R_0^3 - 12.7R_0^2 + 1.5925R_0 + 0.0107 \qquad (9)$$

the life of the inner circumference $30_1$ of the innermost thin metal ring $30_1$ is shorter than that of the inner side surface 30c of the thin metal ring 30.

The reason why a range meeting $R_0 > 0.63$ mm and 0.04 mm$> R_R > 0.07$ is preferable will be described hereinafter.

In view of facility in forming the metal block 32, it is desirable that the radius $R_0$ of curvature of the round side edge 32f of the neck part 32e of the metal block 32 is 0.063 mm or above and does not need to be uselessly big, so that the metal blocks 32 can be manufactured at a high productivity.

In a region D in FIG. 21 where the radius $R_R$ of curvature of the inner side edges 30d and 30e of the thin metal ring 30 is in the range of 0.04 to 0.07, the radius $R_R$ of curvature of the inner side edges 30d and 30e of the thin metal ring 30 must be sharply diminished according to the decrease of the radius $R_0$ of curvature of the round side edges 32f of the neck part 32e of the metal block 32 when the radius $R_0$ of curvature is 0.63 mm or below (region E); that is, the relation between the radii $R_R$ and $R_0$ is liable to lie in the unpreferable region A when the radius $R_0$ of curvature of the round edges 32f of the neck part 32e of the metal ring 32 decreases due to error. In a region F in FIG. 21 where the radius $R_R$ of curvature of the inner side edges 30d and 30e of the thin metal ring 30 is 0.04 mm or below, Hertz stress is increased by the contact of the thin metal ring 30 with the side surfaces of the pulley grooves of the drive and driven pulley.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An endless metal belt for a metal belt type nonstep variable-speed transmission, extended between a drive pulley and a driven pulley included in the metal belt type nonstep variable-speed transmission, respective effective diameters of the drive and the driven pulley being variable to change speed change ratio, said endless metal belt comprising:

thin metal rings layered in thicknesses to form two layered ring structures; and a plurality of metal blocks arranged along and supported on the two layered ring structures, wherein side edges of inner and the outer circumferences of each of the thin metal rings are rounded in round side edges of a radius $R_R$ of curvature, middle parts of opposite side surfaces of each thin metal ring are flat, front and rear edges of opposite side surfaces of a neck part of each metal block are rounded in round edges of a radius $R_0$ of curvature, respectively, and the radius $R_R$ of curvature of the round side edges of the inner and the outer circumference of each thin metal ring and the radius $R_0$ of curvature of the front and the rear round edge of the opposite side surfaces of the neck part of each metal block are determined so that a stress relating to fatigue strength and induced in the inner circumference of the innermost thin metal ring is equal to or lower than a stress relating to fatigue strength and induced in the inner side surface of the thin metal ring by the front and the rear edges of the side surface of the neck part of the metal block that come into contact with the thin metal ring.

2. An endless metal belt for a metal belt type nonstep variable-speed transmission, extended between a drive pulley and a driven pulley included in the metal belt type nonstep variable-speed transmission, respective effective diameters of the drive and the driven pulley being variable to change speed change ratio, said endless metal belt comprising:

thin metal rings layered in thicknesses to form two layered ring structures; and a plurality of metal blocks arranged along and supported on the two layered ring structures, wherein $R_R$ is in the range of $0.04t/0.18$ to $0.07t/0.18$ and $R_0^3 t/3$, where $R_R$ is a radius of curvature of round side edges of inner and outer circumferences of each of the thin metal rings, $R_0$ is a radius of curvature of front and rear round edges of opposite side surfaces of a neck part of each metal block and t is thickness of the thin metal rings, the radius $R_0$ of curvature of the front and the rear edge of the opposite side surfaces of the neck part of each metal block is big when the radius $R_R$ of curvature of the round side edges of the inner and the outer circumference of each of the thin metal rings is big, and the radius $R_0$ of curvature of the front and the rear round edge of the opposite side surfaces of the neck part of each metal block is small when the radius $R_R$ of curvature of the round side edges of the inner and the outer circumference of each of the thin metal rings is small.

3. An endless metal belt for a metal belt type nonstep variable-speed transmission, extended between a drive pulley and a driven pulley included in the metal belt type nonstep variable-speed transmission, respective effective diameters of the drive and the driven pulley being variable to change speed change ratio, said endless metal ring comprising:

thin metal rings layered in thicknesses to form two layered ring structures; and a plurality of metal blocks arranged along and supported on the two layered ring structures, wherein side edges of inner and outer circumferences of each of the thin metal rings are rounded in round side edges of a radius $R_R$ of curvature, middle parts of opposite side surfaces of each thin metal ring are flat, front and rear edges of opposite side surfaces of a neck part of each metal block are rounded in round edges of a radius $R_0$ of curvature, respectively, and the radius $R_R$ of curvature of the round side edges of the inner and the outer circumference of each thin metal ring and the radius $R_0$ of curvature of the front and the rear round edge of opposite side surfaces of the neck part of each metal block meet the following inequality:

$$R_R \leq 35R_0^3 - 12.7R_0^2 + 1.59R_0 + 0.01.$$

* * * * *